INVENTOR.
Harold T. Avery

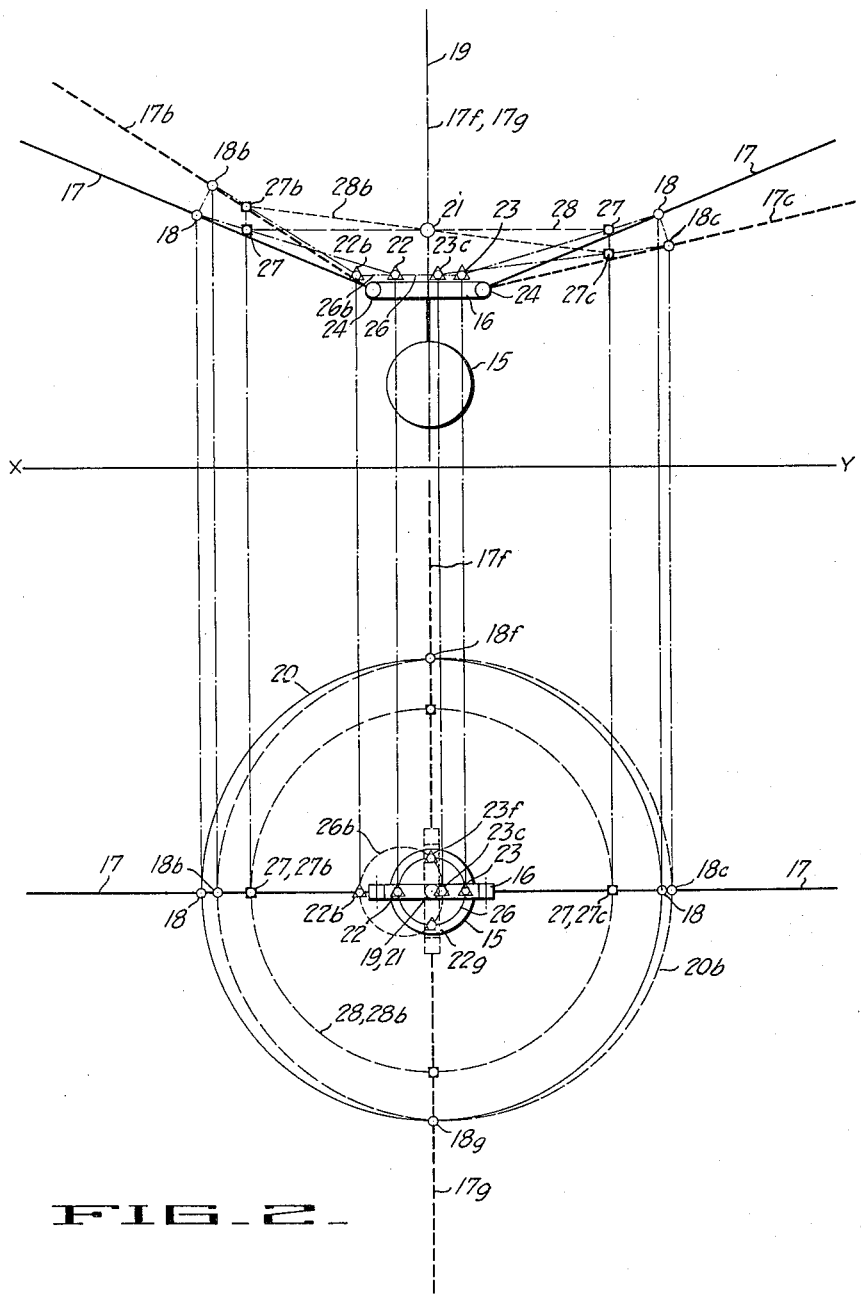

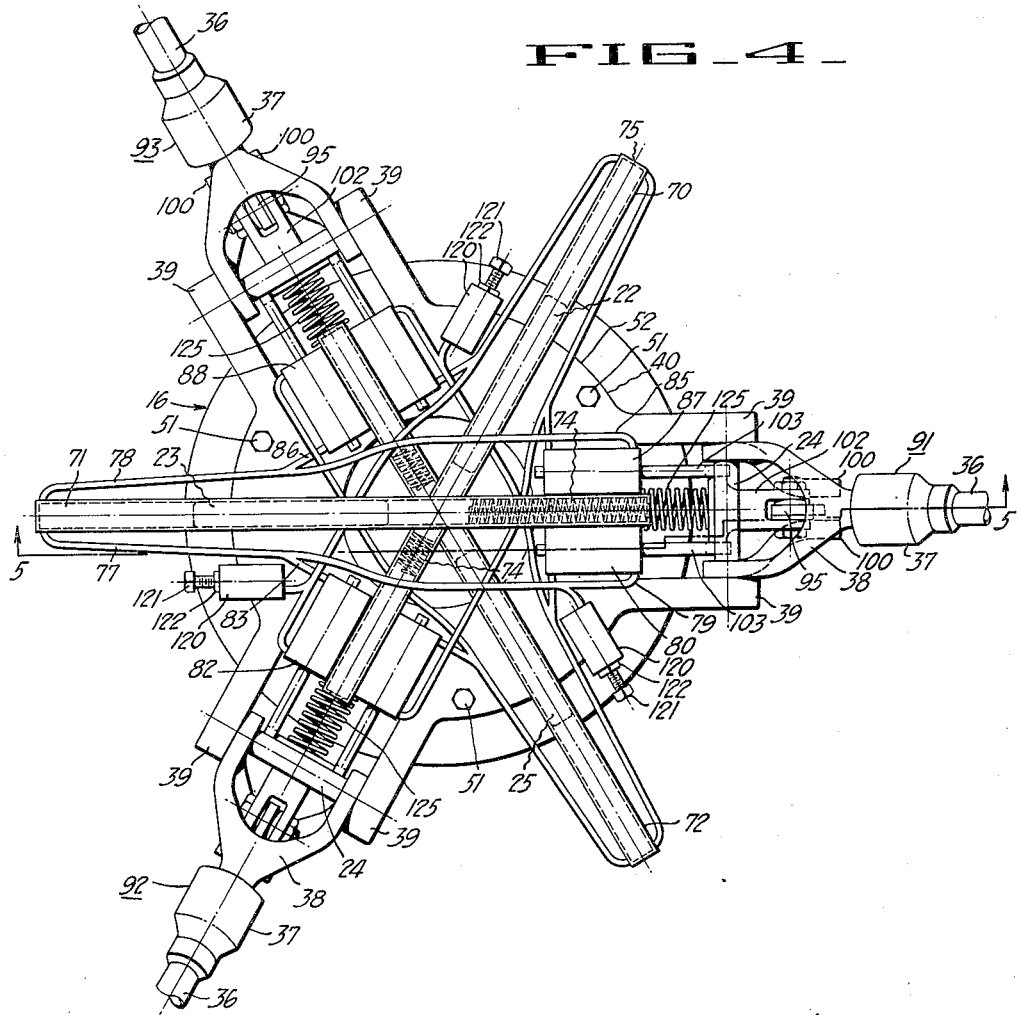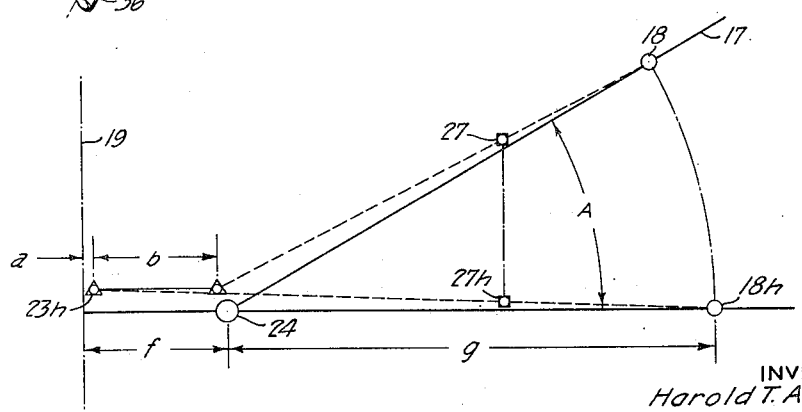

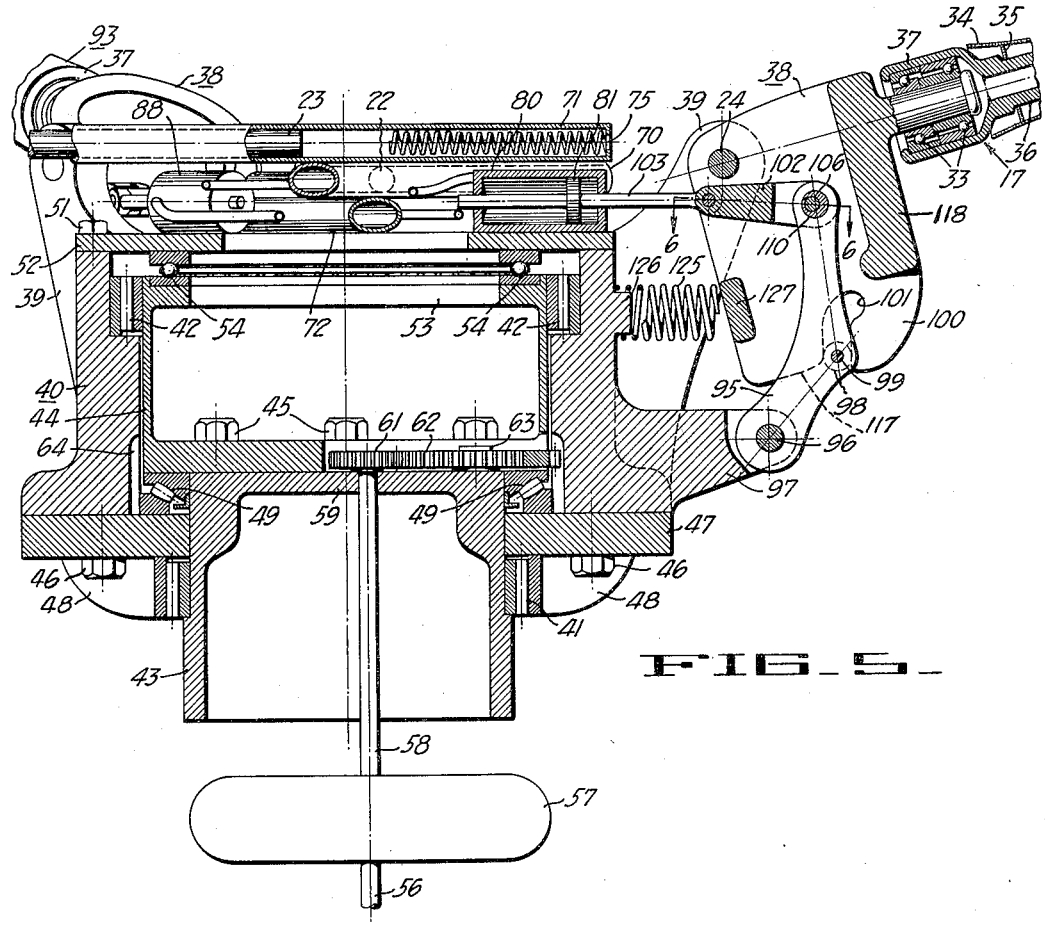
FIG_5_
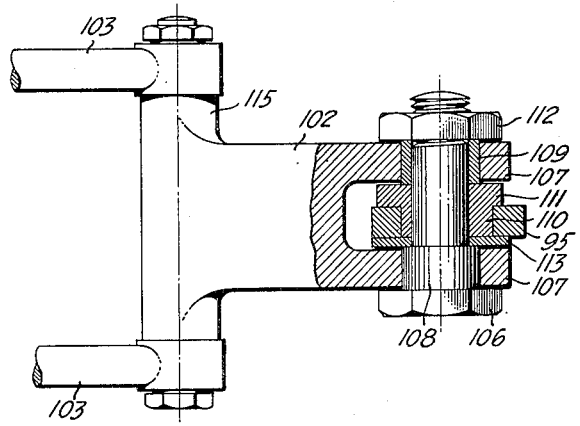
FIG_6_
INVENTOR
Harold T. Avery
ATTORNEYS

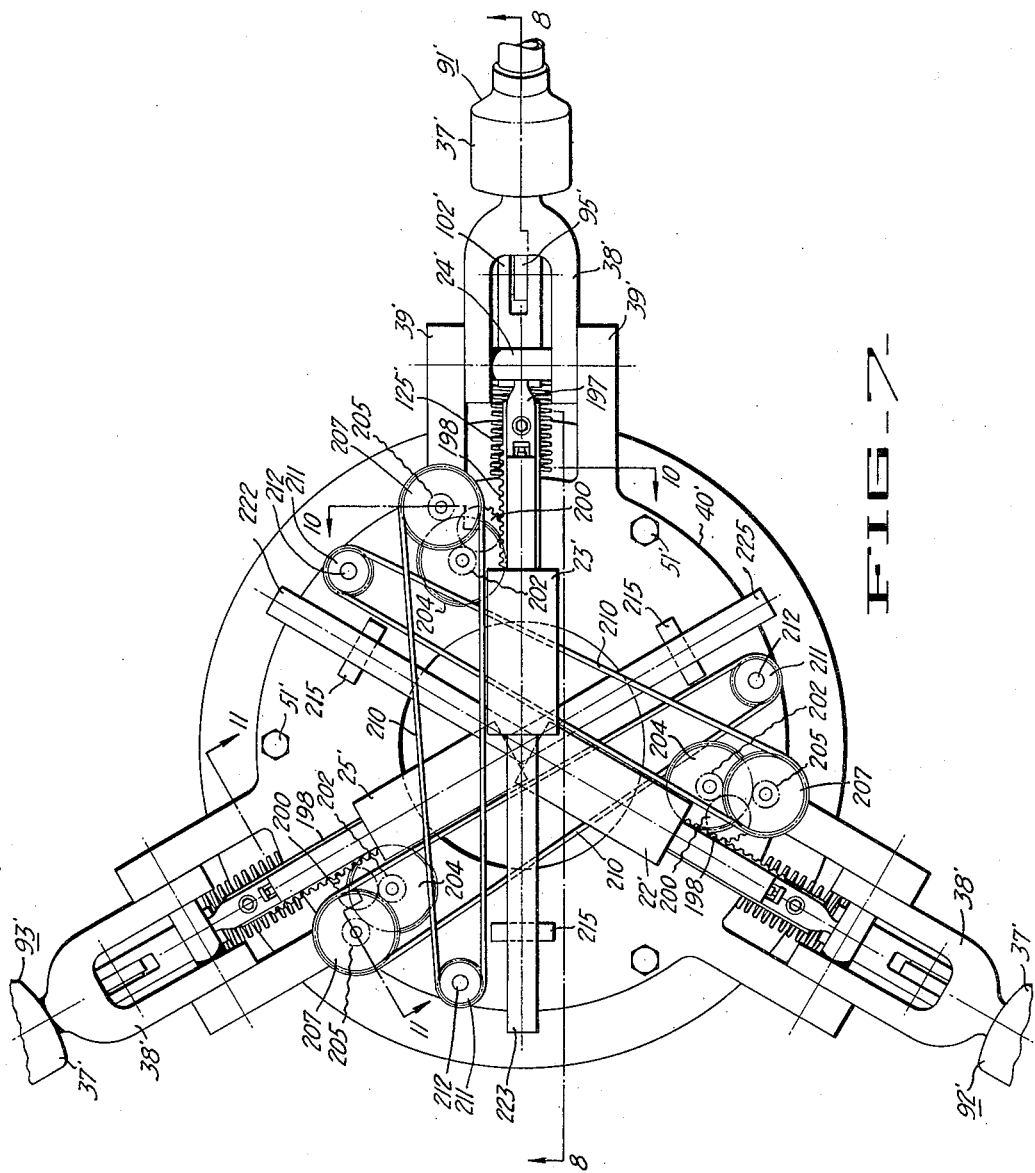

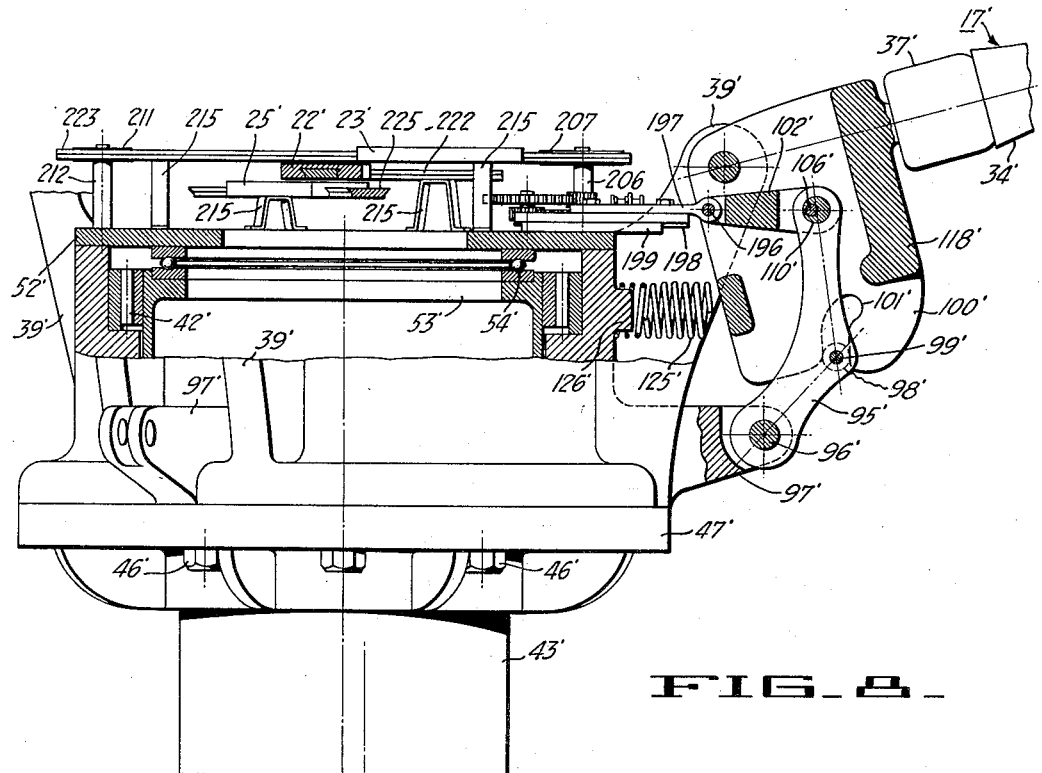
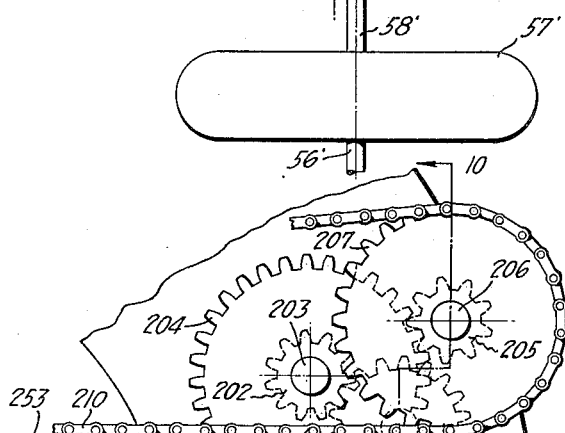
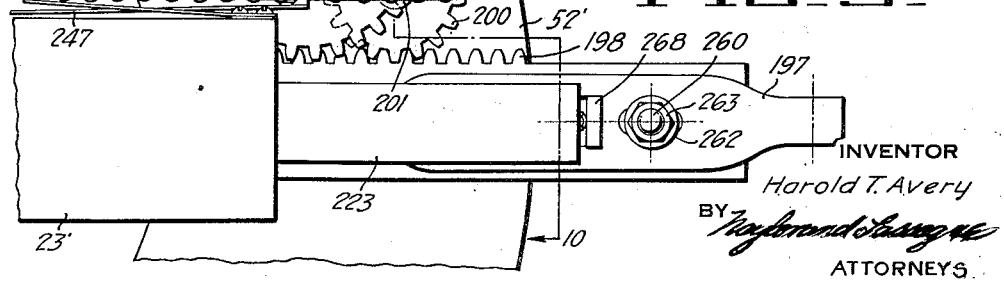

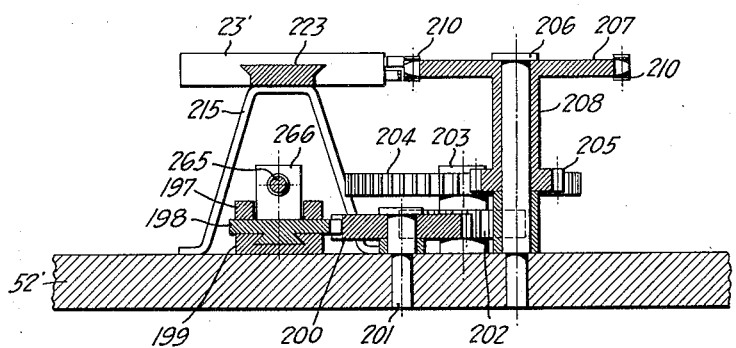
FIG_10_
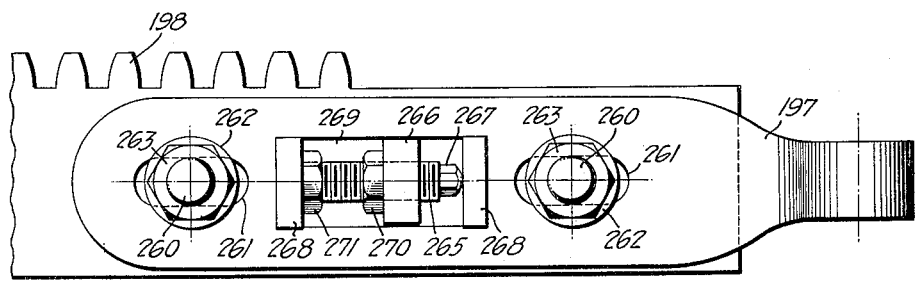
FIG_14_
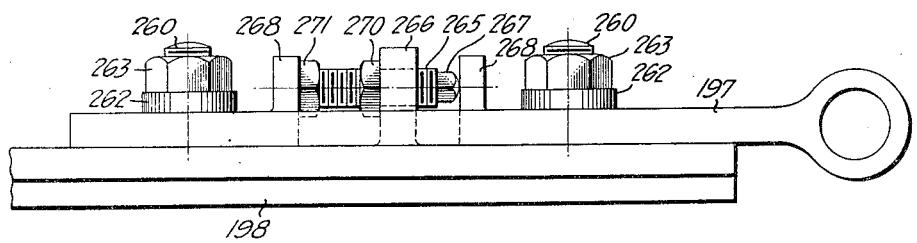
FIG_15_
INVENTOR
Harold T. Avery
BY
ATTORNEYS

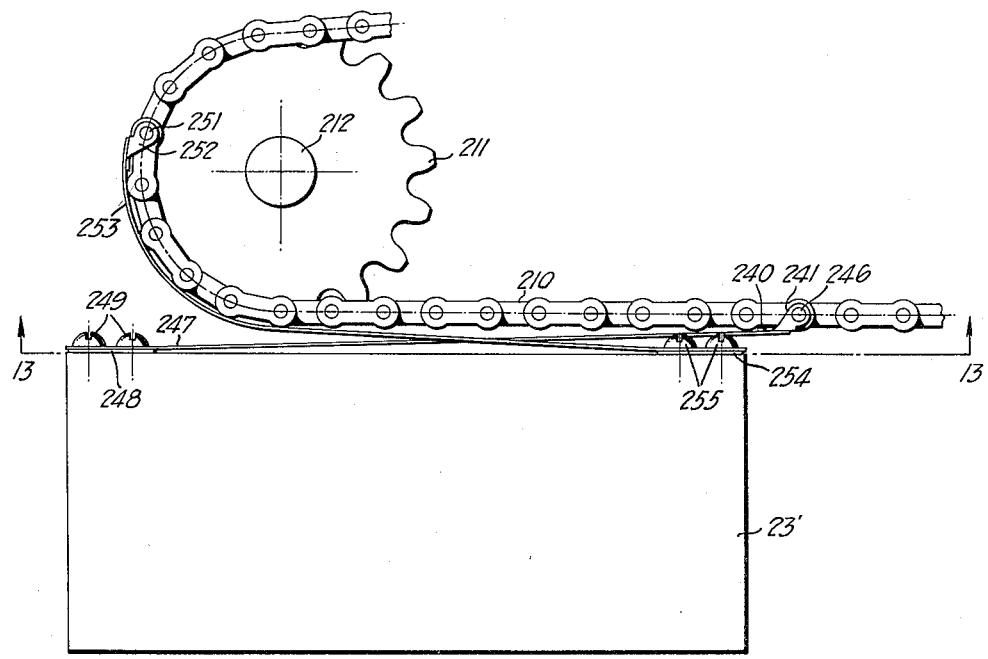
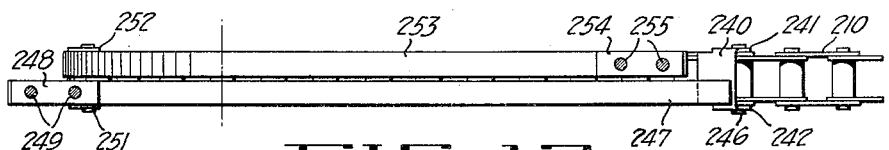
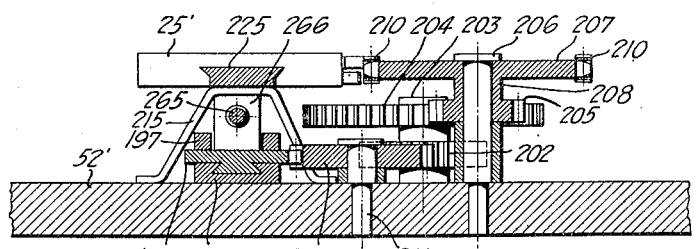

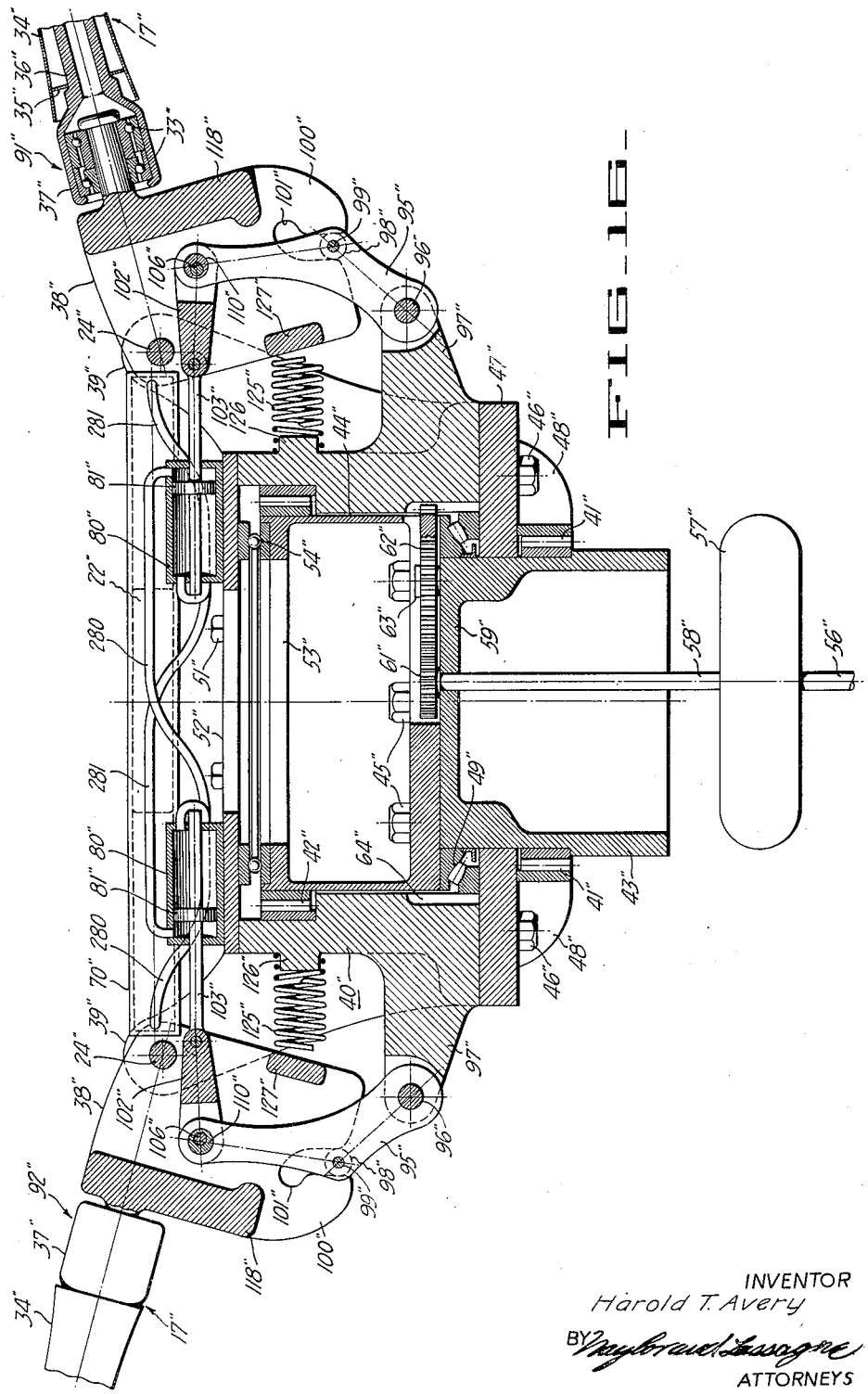

Patented Jan. 30, 1951

2,539,562

UNITED STATES PATENT OFFICE 2,539,562

ROTATING WING AIRCRAFT

Harold T. Avery, Oakland, Calif.

Application April 29, 1946, Serial No. 665,653

11 Claims. (Cl. 170—160.57)

This invention relates to rotating wing aircraft and particularly to improvements in the sustaining rotors for such craft. It is disclosed as applied to rotors of the articulated type, that is, rotors in which the blades are hinged to a central hub member, and it is in rotors of this type that the advantages of the invention may be most fully realized.

Rotors of both the articulated and non-articulated types are known in the art and have been constructed and flown. In rotors of the non-articulated type each blade of the rotor is constructed in fixed relationship to the rotor hub except for freedom of the blade to be rocked on its own longitudinal axis to effect change in blade pitch, and for such further slight changes in relationship as may be introduced by the bending of the blades due to their own flexibility. In rotors of the articulated type, the blades ordinarily retain the same freedoms of movement relative to the hub as in rotors of the non-articulated type plus: (1) the freedom provided by introducing a so-called "flapping" hinge at the root of each blade permitting the blade to be fully rocked up and down in response to the forces acting on it in flight, and usually also (2) the freedom provided by additionally introducing near the root of each blade a so-called "drag" hinge permitting it to be angularly disposed in its general plane or cone of rotation.

Rotors of the articulated type exhibit a number of advantages as compared to rotors of the non-articulated type, among which are the following:

1. The stresses in the blades, and particularly at the blade root, are minimized.
2. Because of this, much less effort is required to effect the rocking of the blades on their own longitudinal axes to introduce changes of pitch.
3. Since each blade is free to readjust itself in response to all changes or disturbances in flight conditions, instead of transmitting such disturbances to the craft itself, the articulated rotor is the most successful in smoothing out air disturbances.
4. This same inherent ability of the articulated rotor to readjust itself to all kinds of flight conditions gives greater insurance against its being forced into dangerous flight attitudes, hence providing a rotor which is inherently safer under adverse flight conditions.
5. If used in conjunction with a pitch control arrangement in which the pitch of each blade is controlled through a link pivotally attached to it forward and outboard of its flapping hinge, the rocking of the blade about its flapping hinge, can be arranged to provide inherent safety against stalling of the motor in case of engine failure, and to provide such safety in the simplest and safest manner conceivable, for slowing down of the rotor will automatically reduce blade pitch into the range of pitch settings capable of sustaining auto-rotation.

It is, therefore, not surprising that up to the present time all rotating wing aircraft (of both the Autogiro and helicopter types) which have been repetitively produced in any quantities and flown under any great variety of weather conditions are sustained by rotors of the articulated blade type. Such rotors, however, have certain disadvantages as compared to rotors of the non-articulated type. One of the chief disadvantages of the articulated rotor lies in the prevalence of large amounts of vibration in that type of rotor. Such vibrations occur primarily due to the manner in which the center of gravity of such rotors is continually shifting, so that a rotor which is perfectly balanced under one set of conditions will be out of balance under other conditions. These shifts are primarily due to unequal displacement of the respective blades about their respective drag hinges and/or unequal rocking of the blades about their respective flapping hinges.

One of the most troublesome sources of such unequal displacement and rocking is to be found in aerodynamic dissimilarity between the respective blades. Very slight amounts of twist or warp, or imperfection in part of the airfoil surface will very readily cause one blade to produce more or less lift than the other blades do under the same circumstances, and hence cause that blade to continuously ride higher or lower than the track described by the other blades in their circuits. So long as all blades follow exactly the same track, and particularly if there are more than two blades in the rotor, inequalities in the flapping angles of the blades at different points in the circuit do not tend to cause very serious vibration, for under these circumstances the center of gravity remains permanently displaced in a direction generally opposite to that part of the circuit in which the blades rock the highest, and the center of gravity remains very nearly fixed relative to the craft. However, if the aerodynamic characteristics of one blade cause it to permanently track any higher or lower than the others, it will cause the center of gravity of the rotor to be shifted away from or toward that blade in all parts of its circuit, thus producing substantially the same effect as an eccentrically located weight rotating with the rotor, which of course produces bad vibration. Also, if the pitch setting of a blade with such different aerodynamic shape is readjusted relative to that of the other blades by an amount sufficient to bring it back into substantially the track described by the other blades, its difference in aerodynamic shape is very apt to cause a difference in drag which will cause that blade to be displaced differently from the others about its drag hinge, thus causing a shift in the center of gravity of the rotor in the direction of such difference of displacement, which again is equivalent to an eccentric weight rotating with the rotor and causes bad vibration. A great deal of the trouble and expense involved in the manufacture and maintenance of articulated rotors is due to the effort to secure and maintain perfect aerodynamic similarity, as well as perfect mass balance, between all blades.

A second shortcoming, which, as a rule, is more marked in the articulated than in the non-articulated rotors as actually constructed is the tendency for the blades to "droop" low enough as the rotor is being started or stopped so that they constitute a menace to personnel in the immediate vicinity of them. As soon as the blades attain any considerable fraction of their normal rotational speed, they develop enough lift to rock upwardly about their flapping hinges at a "coning" angle sufficient to remove this menace. Because the blades of an articulated rotor do not have to be constructed with sufficient strength and rigidity to transmit bending moments to the central hub, and ordinarily are not so constructed, they must be permitted to freely rock as low about their flapping hinges as there will ever be any tendency for them to rock in flight, which together with the less rigidity of the blades ordinarily employed in the articulated rotor increases the tendency for this "droop" to reach such proportions in this type of craft as to involve danger to personnel or objects standing under the outer portion of the rotor when it is started or stopped. Furthermore, the non-articulated rotors have usually been employed in double rotor craft, the two rotors usually being coaxial, while the articulated rotor has usually been employed in single rotor craft, thus as a rule requiring the use of a greater rotor diameter, and consequently greater "droop."

My copending application Serial No. 645,309, filed February 4, 1946, now Pat. #2,531,598, Nov. 28, 1950 discloses means for eliminating all the above described disadvantages of the articulated rotor while retaining all the advantages thereof above outlined. For accomplishing this said application discloses means comprising compensating weights mounted in the respective blades and automatically shiftable longitudinally of the blades in such a manner as to stabilize the center of gravity of the rotor and to eliminate the necessity for individual drag hinges.

It is an object of the present invention to eliminate the vibration which has been characteristic of the articulated rotor, without requiring any alteration in the construction of the blades.

It is an object of the present invention to minimize the required mass of the compensating weights and the forces required to position them.

It is a further object to minimize the moments set up between the blades and the hub by the mechanism provided for automatically adjusting the compensating weights.

It is an object of the invention to provide a rotor which will be particularly easy and inexpensive to manufactre and maintain.

More specifically, it is an object of the invention to remove by particularly improved means the necessity for aerodynamic similarity between the various blades of a rotor, which necessity has been paramount and costly in articulated blade rotors.

It is also an object of the invention to provide improved novel means for easily balancing a rotor even though the blades of the rotor differ considerably from each other in the amount and distribution of mass in the respective blades.

The novel features of the invention are set forth with particularity in the appended claims. The invention itself, however, together with additional objects and advantages thereof will be best understood from the following description thereof, when the same is read in connection with the accompanying drawings, in which:

Figure 2 is a similar diagram of a rotor embodying my invention.

Figure 3 is a diagram illustrating in elevation the flapping movement of a blade and showing dimensionally the operation of the novel means I employ for stabilizing the center of gravity of the rotor and eliminating cyclic accelerations and decelerations of the blades.

Figures 4, 5 and 6 illustrate a rotor equipped with one embodiment of my novel mechanism for compensating for blade displacements, hydraulic means being employed for operating the compensating weights in this embodiment. More specifically:

Figures 4 is a plan view showing the rotor hub and the adjacent portion of the blades.

Figure 5 is a vertical section of the rotor taken substantially on line 5—5 of Figure 4, and showing also a portion of the rotor driving means.

Figure 6 is an enlarged sectional view of certain connecting and adjusting mechanisms taken substantially on line 6—6 of Figure 5.

Figure 1:
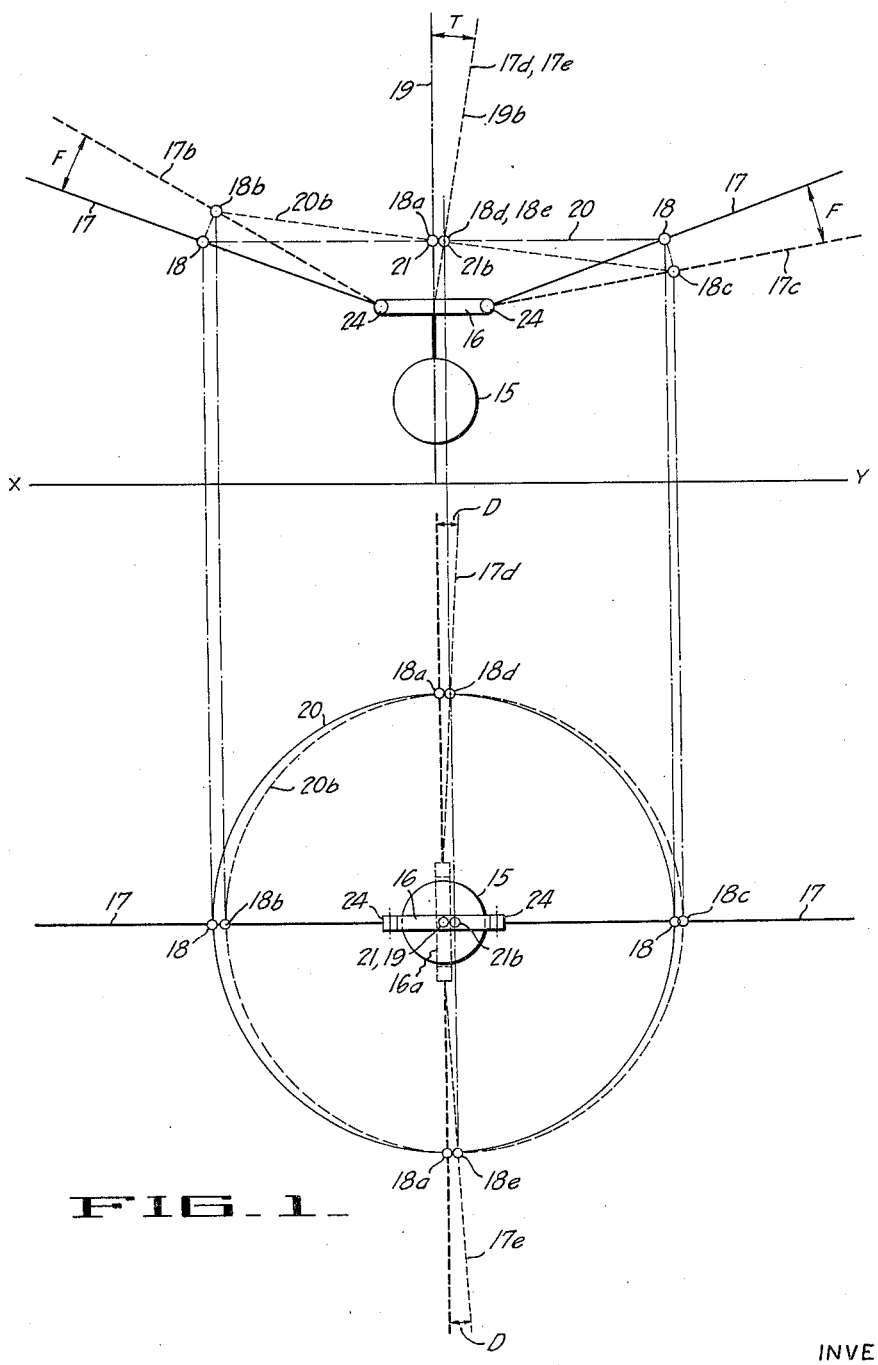
Figure 1 is a diagram illustrating, in accordance with the practices of descriptive geometry projection, certain of the movements of the blades, and particularly of the centers of gravity thereof, in articulated sustaining rotors characteristic of the prior art.

Figures 7 to 15, inclusive, disclose an alternative form of the invention designed to utilized solely mechanical means for positioning the compensating weights while the embodiment disclosed in Figures 4 to 6, inclusive, utilizes hydraulic means. More specifically:

Figure 7 is a plan view of a rotor hub and portions of the adjacent blades.

Figure 8 is a front view of this same mechanism shown partially in vertical section taken substantially on line 8—8 of Figure 7.

Figure 9 is an enlargement of a portion of Figure 7 showing in greater detail the mechanism for transmitting movement to one of the compensating weights.

Figure 10 is a vertical section through this unit, taken substantially along the line 10—10 of Figures 7 and 9.

Figure 11 is a similar vertical section taken substantially along the line 11—11 of Figure 7.

Figure 12 is a plan view of one of the compensating weights and of the means for transmitting movement to it.

Figure 13 is a vertical section of this mechanism taken along line 13—13 of Figure 12.

Figure 14 is an enlarged plan view of the means provided in conjunction with each blade for adjusting the position of the novel mechanism positioned by the blade.

Figure 15 shows the same adjusting means in elevation.

Figure 16 relates to a third embodiment of the invention as applied to a two-bladed rotor and constitutes a cross-section of the rotor of this embodiment corresponding to the cross-section of the first embodiment illustrated in Figure 5.

Faults of articulated rotors of the prior art (Figure 1)

As previously noted, Figure 1 diagrammatically illustrates certain elements typical of prior art construction embodying articulated rotors. The diagram is drawn in accordance with the practice of descriptive geometry, wherein the mechanism is shown as projected onto the two coordinate planes rotated into the plane of the paper.

The line XY is the base line constituting the line of intersection of the two coordinate planes. The portion of the drawing above the line XY constitutes the projection of the mechanism onto a vertical plane, and the portion below it the projection of the same mechanism onto a horizontal plane. The fine dotted vertical lines are for the purpose of connecting one projection of each of certain points to the other projection thereof, so as to make the relationships discussed more readily apparent.

The weight lifted by the rotor, which ordinarily consists of the fuselage and its contents, is diagrammatically illustrated in Figure 1 as a spherical weight 15, suspended from the rotor hub 16. Pivotally attached to this hub by means of flapping hinges 24 are a plurality of blades 17, illustrated as two in the diagram. The center of gravity of each of these blades is located at a point 18 fixed in the blade. When the craft is hovering stationary in the air each blade 17 extends outwardly and upwardly from the hinge which attaches it to hub 16 at such an angle that the vertical projection of the blade bears to its horizontal projection the same ratio that the net lift contributed by the blade bears to the centrifugal force acting on the blade, and the sum of the lift forces contributed by all blades equals the weight of the craft. Normally under these circumstances the axis 19 about which the blades are rotating extends vertically upward and if the blades are accurately similar they make equal angles with the axis, and their centers of gravity 18 move in a truly horizontal circle 20, and for uniform speed of the driving means move at uniform speed around this circle. A rotation of one quarter turn, for instance, from the positions at which the blades are illustrated in solid lines will bring their centers of gravity 18 into the two diametrically opposite positions 18a, and if the axis of hub 16 coincides substantially with vertical axis 19, the angular movement of the blade hub will equal the angular movement of the blade and no necessity will exist for any displacement of the blades about their drag hinges; a drag hinge as previously mentioned being a hinge (usually substantially vertical and located near the root of a blade) for permitting the blade to be advanced or retarded relative to the hub in its rotation.

In order to impart horizontal movement to a craft which is sustained in a hovering position by an articulated rotor, as above described, it is necessary to tilt the rotor in the direction of desired movement. For instance, to produce rightward acceleration of the craft the rotor would be tilted rightward into a position such as that indicated by dotted lines in Figure 1, wherein the left blade 17 is rocked upward through the flapping angle F into the position 17b, and the opposite blade rocked downward by substantially the same angle to the position 17c, bringing the centers of gravity 18 of these two blades to the positions 18b and 18c, respectively. Under these conditions the centers of gravity 18 rotate in the circle 20b, concentrically located with respect to the axis 19b which is tilted rightward by the tilt angle T from the original axis of rotation 19, the tilt angle being nearly the same as the corresponding angles F of the blade displacement about the flapping hinges, particularly if the diameter of hub 16 is small as compared with blade length. The resultant rotor force on the craft, now being directed diagonally upward toward the right, has a horizontal component which produces horizontal rightward acceleration of the craft, which in turn produces an opposing drag force on the fuselage 15. The horizontal component of the rotor force being vertically offset from the drag force on the fuselage causes the craft to tilt. If the axis 19b of rotor rotation be maintained at a constant angle to the vertical (not a constant tilt relative to the craft), then as the horizontal speed of the craft becomes greater and consequently the drag force increases the tilt of the craft will increase while the net horizontal forces producing acceleration will decrease, until finally the tilt of the craft equals the tilt of the rotor and the craft settles down to a uniform speed of horizonal movement with the rotor maintaining substantially its original normal relationship to the craft, but not to the vertical. However, during the time that any control is being exercised on the craft to produce any horizontal acceleration or deceleration thereof the rotor must be tilted out of its normal relationship to the craft, and the conditions which exist during this period of time will now be further analyzed.

In rotating wing craft sustained by articulated rotors different methods have been employed to effect the tilting of the rotor relative to the craft. In Autogiros it has been customary to construct the blades so that they will maintain fixed pitch angles relative to their respective flapping hinges during flight, and to exercise horizontal control by tilting the rotor hub, which tilting angularly displaces the flapping hinges and consequently produces changes in the pitch angles of the blades such as to produce aerodynamic forces which serve to so alter the path of movement of the blades as to bring them into substantially the same positions relative to the tilted hub that they originally held relative to the hub in its original position. In helicopters, however, such tilting of the hub ordinarily offers more complications on account of the continuous power drive to the rotor. Also in helicopters it is possible to take advantage of the fact that it is ordinarily necessary in such craft to provide means for independently adjusting the pitch of the blades by individually rotating them on their own longitudinal axes in order to exercise control for vertical climb and descent. All of this has resulted in a different construction ordinarily being employed in articulated rotor helicopters, namely one in which the hub is maintained on an axis fixed relative to the craft but in which the path of blade movement may be altered by changes of blade pitch cyclically imposed upon the blades so as to bring about a tilting of the cone of blade movement very closely comparable to that produced by tilting of the hub in an Autogiro. Although the invention is applicable to craft embodying either of these arrangements, the following discussion of prior art construction, as well as that relating to the invention, applies particularly to the arrangement wherein the rotor hub is maintained on an axis fixed relative to the craft, and tilting of the rotor is brought about by changing the path of movement of the blades relative to the hub through cyclic changes of blade pitch. A typical prior art arrangement for accomplishing this is illustrated and described in the magazine "Aviation" for June 1945 at pages 122 to 130, and is there referred to as the NX–1272 helicopter.

Referring again to Figure 1, it will be apparent that if the axis of hub 16 is fixed relative to the craft, remaining in the direction indicated by line 19, then if the blades are, as previously described, brought to move in paths concentrically located relative to axis 19b, each blade will rock upward about its flapping hinge as it passes from position 17c to position 17b and downward as it passes from position 17b to position 17c. Also if the blades and the hub are to move with uniform rotational speed considerable displacement on the drag hinges will also be involved.

For instance, when the blades occupy the positions identified as 17b and 17c in the upper projection of Figure 1, their horizontal projections are colinear with the solid line positions labeled 17, 17 in the lower projection, and the position of hub 16 is that shown in solid lines. If the hub is then rotated one quarter turn counterclockwise from this position to the position 16a shown in dotted lines without any displacement of the blades about their drag hinges, the projections of the blades will then be coincident with the vertical center-line 19 in the upper projection and coincident with the extension of this line in the lower projection. The center of gravity of the right hand blade will have moved from point 18c to the point where the circle 20b crosses the center-line 19 (which is very nearly coincident with the upper point 18a in the lower projection and with the point 18a in the upper projection) and the center of gravity of the left hand blade will have moved from point 18b to the point where circle 20b crosses back across the center line 19 (which point is very nearly coincident with the lower point 18a in the lower projection, and in the upper projection is coincident with the point to which center of gravity 18c has moved as above described). It is obvious that under such circumstances the center of gravity 18c of the right hand blade has travelled much further than the center of gravity 18b of the left hand blade. In order for the centers of gravity 18b and 18c to travel equal distances from their original positions it would be necessary to have center 18c travel only to point 18d, which point is so located that its vertical projection lies on the same line as the projection of axis 19b. Similarly center 18b must travel on to point 18e, the vertical projection of which coincides with that of point 18d. In order to bring the centers of gravity of the two blades to positions 18d and 18e, one blade must be displaced clockwise through the angle D about its drag hinge, bringing the horizontal projection of that blade to 17d, while the other blade is rocked counterclockwise through the same angle about its drag hinge, bringing the horizontal projection of that blade to 17e. The vertical projection of both blades coincides with that of axis 19 in the case of no displacement about the drag hinges, and coincides with that of axis 19b in case both blades are displaced in opposite directions through the angle D about their drag hinges as above described. Thus it is evident that if, with the rotor tilted to the right into its dotted line position, both the hub and the blades are to rotate at uniform speeds (which is necessary in order to avoid vibration of the craft due to accelerations and decelerations of the blades or of the rotor driving system) each blade must follow a pattern of movement in which (1) it is displaced in a lagging direction as its center of gravity moves counterclockwise from point 18c until by the time it reaches point 18d this lagging displacement about the drag hinge equals D; (2) thereafter it starts to advance about its drag hinge until as the center of gravity reaches point 18b it is back again in its normal angular position on its drag hinge; (3) it continues to advance until by the time the center of gravity reaches point 18e the blade has advanced by the angle D ahead of its normal position on its drag hinge; and (4) thereafter its starts lagging again until upon return to point 18c the blade is again back in its normal position on its drag hinge.

This same pattern of blade displacement is also necessary in order to avoid vibratory displacements of the center of gravity of the entire rotor. The center of gravity of the entire blade system of the rotor naturally lies at the center of the circle described by the centers of gravity of the blades providing these centers of gravity are equally spaced about this circle. When the rotor is in hovering condition, as indicated by solid lines, the center of gravity of the rotor lies at point 21, the center of circle 20. However, when the rotor is tilted as illustrated, this center is displaced to 21b, the center of circle 20b. That is, it is evident that when the centers of gravity of the two blades lie at 18b and 18c, respectively, the resultant center of gravity will be at 21b. Similarly, after the hub has rotated one quarter turn it is evident that the center of gravity of the rotor will still lie at 21b providing the centers of gravity of the blades lie at 18d and 18e, respectively, but if no displacement of the blades about their drag hinges had been permitted to take place, the projection of both blades would coincide with center line 19 and the center of gravity of the rotor would fall in a position both projections of which would fall on this center line, namely a position very nearly coinciding with the original location 21 of the rotor center of gravity. Hence, if no displacement of the blades about their drag hinges were permitted the center of gravity of the rotor would vibrate twice each cycle between point 21b and a point substantially coincident with point 21, which vibration would cause bad vibration of the craft. However, if the blades are displaced about their drag hinges so that when the center of gravity of one blade lies at 18d that of the other blade lies at 18e, not only do we attain uniform rotational velocity of the blades concurrently with uniform rotational velocity of the hub, as previously described, but we also maintain the center of gravity of the rotor steadily at point 21b instead of causing it to vibrate cyclically.

The foregoing description makes it clear why it has proved necessary to equip the articulated rotors of the prior art with drag hinges, individual to the respective blades. However, these prior art rotors have not been equipped with any positive means to constrain the blades to move in the desired manner about their drag hinges. By locating the drag hinges outboard of the rotational axis, centrifugal force on the blades has been utilized to yieldably resist displacement of the blades about their drag hinges, and other means have been sometimes utilized to supplement it in so doing. However, the momentum of the blades is principally responsible for producing the proper displacements about the drag hinges and if it is opposed by any of these other means in so doing the resulting displacement is less than the proper one and vibration results. This has been generally true of the articulated blade helicopters of the prior art. Also irregular disturbances of the air may cause irregular displacement of the blades about their drag hinges with consequent displacement of the center of gravity of the rotor and corresponding vibration. When the craft is in close proximity to the ground, a particularly aggravated form of this condition may develop wherein an air disturbance set up by one blade may be reflected from the ground in such a path as to directly engage another blade at cyclic intervals dependent upon rotor speed and craft movement. When these intervals coincide with the natural frequency of blade displacement, a condition may result known as "ground resonance" which may cause very destructive vibration.

While the means, previously mentioned, for yieldably resisting displacement of the blades is usually of a form that will tend to return to normal a blade that has been irregularly displaced, such centering action cannot be made very strong in comparison with the effect of blade momentum in displacing the blade about its drag hinge, or as previously mentioned the momentum will normally produce too small a fraction of the proper displacement to suitably minimize vibration. Therefore, the arrangement must be such that blade momentum is the predominant factor in determining the position of the blade about its drag hinge. But if this is the case the increment of momentum imparted to the blade by an irregular displacement, such as above mentioned, will tend to cause the displacement to continue to increase after the air disturbance originating the irregular displacement has disappeared and hence the irregular displacement caused by a small disturbance may reach considerable proportions and be very slow in disappearing, and as long as it persists will cause a displacement of rotor center of such a nature that the displacement will rotate with the rotor and therefore cause vibrations corresponding to an eccentrically placed weight. Hence, while it has been necessary to provide drag hinges in the articulated rotors of the prior art, no means have been devised to positively control the blades to move properly about their drag hinges, and such means as have been provided to produce the proper displacements and to resist and wipe out the improper displacements have conflicted with each other to a degree which has caused vibrations both due to too greatly resisting the proper displacements and to not sufficiently resisting and correcting the improper displacements.

In other words, means must be provided to resist, at least yieldably, improper displacements of the blades about their drag hinges, or such displacements will get completely out of hand and cause destructive vibration. However, such means as had been provided for this purpose, due to its inability to discriminate between proper and improper displacements, has resisted the proper displacements of the blades just as much as it has resisted the improper displacements thereof. Since just as bad vibration will be caused by mispositioning of a blade about its drag hinge due to its proper displacements having been resisted, as by the same amount of mispositioning due to the introduction of improper displacements from extraneous sources the prior art means for controlling drag displacements have been incapable of eliminating vibration. Each of these prior art means for resisting drag displacements has necessarily been in its very nature a compromise bound to produce considerable vibration by resisting the proper displacements of the blades if its resistance to drag displacements was great enough to reasonably control the improper displacements thereof.

*Schematic outline of the invention (Figure 2)*

Figure 2, like Figure 1, is a descriptive geometry projection of a rotating wing craft embodying an articulated sustaining rotor, but while Figure 1 illustrates a typical craft of the prior art, Figure 2 illustrates a craft embodying my invention. As in Figure 1, the fuselage and its contents, diagrammatically illustrated by weight 15, is supported by a rotor comprising hub 16 and blades 17, the latter having centers of gravity 18, which, when the rotor is tilted by bringing the blades to positions 17b and 17c, respectively, assume the positions 18b and 18c, respectively.

In order to eliminate the necessity for drag hinges individual to the respective blades, I propose to provide mechanism for stabilizing the center of gravity of the rotor. In order that the basic principles upon which this mechanism operates may be clearly understood, I shall, first of all, describe the operation of a schematically simplified form thereof. In this form of the invention I provide in conjunction with each blade a compensating weight which is arranged to be automatically displaced by flapping movement of the blade in a direction radially aligned with the blade. These compensating weights are shown in Figure 2 as weight 22 for the left hand blade and weight 23 for the right hand blade. In the particular arrangement herein disclosed these weights are reciprocably supported on rotor hub 16. The adjustment of the position of each of these compensating weights is automatically effected, in accordance with the flapping angle of the associated blade, in such a manner as to maintain the resultant center of gravity of the blade and weight at a constant distance from the rotor axis 19. When the blades 17 are in their normal positions, as shown by solid lines, these weights are arranged to occupy the positions labelled 22 and 23, respectively, in Figure 2, under which conditions they move concentrically about axis 19 in the horizontal circle 26 as the rotor rotates. If now, in the manner previously indicated, the left hand blade is rocked upwardly on its flapping hinge 24 to the position 17b, thereby displacing the center of gravity of the blade itself from 18 to 18b, this change of flapping angle is arranged to automatically move the compensating weight which is associated with that blade from position 22 to 22b. The relative weight of the blade and of the weight 22 are such that when the center of gravity of the blade lies at point 18 and that of the weight at the point labelled 22, the resultant center of gravity of the combined blade and weight is located at point 27, and the amount of shift of the weight to position 22b when the blade is rocked up, is such as to bring the resultant center of gravity of the blade and weight in their revised positions to the point labelled 27b, which is located directly above point 27 and hence the same distance from rotor axis 19. Similarly when the right hand blade is rocked down to the position 17c, causing its center of gravity to move further away from axis 19 to the position 18c its compensating weight 23 is caused to shift inwardly to the position 23c so as to bring the resultant center of gravity of the right hand blade and weight to point 27c which is vertically below its original location 27 and hence the same distance from rotor axis 19. Since the resultant center of gravity of each blade and its automatically adjusted weight remains the same distance from the rotor axis regardless of the flapping angle of the blade, the flapping of the blades does not alter nor in any way disturb the center of gravity of the rotor, but it remains at all times on axis 19 at substantially the point 21. Hence when the rotor is turned through one quarter turn from the position illustrated, the blades should occupy a position which will continue to retain the rotor center of gravity on axis 19 if vibratory displacements are to be avoided, which means that all projections of the blades should coincide with center line 19 of Figure 2, as indicated at 17f and 17g in the drawing, which is the condition corresponding to no displacement of the blades about their drag hinges. Since this condition applies for all possible flapping angles of the blades, drag hinges individual to the blades may be eliminated. This elimination will leave the blades always controlled to be diametrically opposite each other, thus entirely avoiding the shifts in rotor center of gravity which have heretofore been incident to irregular displacement of the blades about their drag hinges.

Heretofore, it has been necessary to provide the drag hinges for reasons previously described and the pattern of movement which the blades must describe about their drag hinges in order to preserve smooth operation were of such a nature and so difficult to predict that it was not feasible to provide any mechanism capable of constraining the blades to follow such a pattern of movement. Much of the trouble with vibration in articulated rotors has been traceable to departure of the blades from such a pattern of movement. However, by introducing in conjunction with each blade a compensating weight automatically adjusted by the flapping of the blade in the manner described the pattern of movement of the blades about their drag hinges required to preserve smooth operation is reduced to zero movement, and it becomes practicable to provide means to constrain the blades to follow this pattern of movement, for all that is necessary in order to do so is to eliminate the drag hinges individual to the respective blades, as heretofore necessarily provided. As I shall later describe in more detail, I consider it desirable to provide what amounts to a master drag hinge, to permit some lagging or leading displacement of all blades in unison relative to the rotor driving mechanism in order to prevent transmission to the blades of any sharp irregularities in drive, and to permit them to respond to irregular air disturbances without, however, disturbing their rotational angular relationship to each other nor disturbing the center of gravity of the rotor.

As previously indicated, elimination of the individual drag hinges in the prior art structures would not only cause bad vibratory displacements of the rotor center of gravity but would also cause cyclic accelerations and decelerations of the blades in a manner which would set up vibration. It will therefore be in order to investigate the blade accelerations and decelerations with my new arrangement. With the rotor in its tilted condition, as indicated by the dotted line positions of the blades in the upper projection of Figure 2, the centers of gravity 18 of the blades proper will move in essentially the same eccentric path 29b (lower projection) as previously described in connection with the prior art (Figure 1) and the mass of each blade centered at its respective center of gravity 18 will be decelerated as it moves from 18c through 18f to 18b and accelerated as it moves on through 18g to 18c again. However, the counter-balancing weight 25, which under hovering conditions (with the blades at the flapping angles indicated in solid lines) moved in the concentric circle 26, alters its path of movement when the blades are displaced to their dotted line positions and moves in the eccentric path 29b, the eccentricity of which is opposite to that of path 29b. Each of the weights 22 and 23 will be accelerated as they pass from position 23c through 23f to 22b and decelerated as they pass on through 22g to 23c again. Hence the accelerations and decelerations of these weights will always be opposite to those of the blade proper, and since the weights are supported on the hub for radial movement in line with the blade the net effect will be for these accelerations and decelerations to act toward neutralizing each other. While the mass of the compensating weights will ordinarily be much less than that of the blade the amount of eccentricity of their path of movement will necessarily be correspondingly greater than that of the blade proper in order to maintain the resultant center of gravity of each weight and blade at a constant distance from the rotor axis, as previously described. In fact with the eccentricity of the path of movement of the weight such as to attain this objective, the accelerations and decelerations of each blade and its related weight exactly neutralize each other. This is necessarily true because the net accelerating or decelerating effect, if any, will be that of the resultant center of gravity of the blade and weight which, remaining at a constant distance from the axis, moves in the path 28b which lies in the same cylindrical surface concentrically located with respect to axis 19 as does the circular path 28 described by the resultant centers of gravity 27 of the blades under balanced hovering conditions. The horizontal projection of the path of movement of the resultant centers of gravity 27 is the identical circle 28, regardless of the flapping angles of the blades, and therefore the rotational component of velocity of these centers of gravity will always be constant and no net angular accelerations or decelerations will be encountered.

Therefore, providing in conjunction with each blade a compensating weight and means for automatically adjusting it in the manner described, serves not only to prevent the displacements of rotor center of gravity heretofore caused by differences in the flapping angles of the blades, but also eliminates the necessity for drag hinges individual to the blades, thus rendering it feasible to automatically retain the blades at all times in their proper rotational angular relationship to each other, and eliminating the angular accelerations and decelerations of the blades which have heretofore existed and which would become of prohibitive proportions were the individual drag hinges eliminated without the incorporation of the automatically compensating weights.

By mounting the compensating weights 22, 23 on the hub 16, instead of in the blades as disclosed in my copending application previously referred to, it is possible to avoid the necessity for departing from conventional blade constructions. Also, by getting away from the dimensional limitations which the size of the blade imposes on mechanisms placed within it, the new location of the weights permits of adopting constructions for the weight adjusting mechanism that would not be feasible within the blades, and particularly renders it more readily practicable to interconnect the various blades and weights in a manner adapted to save total weight of the mechanism involved.

Furthermore it makes it feasible to locate the compensating weights so close to the rotor center as to minimize the centrifugal forces acting on them, and hence to minimize the moments exerted on the blades by the weight adjusting mechanism. While, as indicated in said copending application, such moments may be utilized to advantage, at least under certain circumstances, free choice in design of the weight adjusting mechanism is considerably hampered when the establishing of moments within certain limits is a controlling factor in such design. With the compensating weights located on the hub as now proposed, moment considerations do not limit the freedom of design of the weight adjusting mechanism, but separate mechanism may be employed to set up any desired pattern of moments between the blade and the hub.

It is to be understood that while the foregoing description, relating to Figures 1 and 2, has referred to two opposite blades and to right and left directions, movements and forces, the same general effects and results as outlined would apply in case the rotor was equipped with three blades, four blades, or any other number of blades, and that the directions referred to as right and left might equally well constitute forward and back directions relative to the craft or any opposite directions in which it may be desired to investigate or exercise the control.

*Mathematical determination of compensating weight movement*

The amount by which the flapping movement of a blade displaces its related compensating weight has thus far been stated to be such that the displacement will maintain the resultant center of gravity of the blade and weight at a constant distance from rotor axis 19. With the aid of Figure 3 we may now express the position that such a weight should occupy at any given flapping position of the blade in terms of the blade flapping angle and the dimensions and weights of the parts involved. For this purpose:

Let $A$ = flapping angle of the blade, measured upward from the horizontal.

$f$ = the distance of flapping hinge 24 from rotor axis 19.

$a$ = the distance from rotor axis 19 to the position $23h$ occupied by the center of gravity of weight 23 when the blade is horizontal.

$b$ = the distance that weight 23 moves outwardly along the radius to the blade as the blade is rocked upwardly from the horizontal through flapping angle A.

$g$ = the distance along the blade axis from hinge 24 to the center of gravity 18 of the blade proper.

$B$ = the mass of the blade proper.

$W$ = the mass of compensating weight 23.

The distance of the resultant center of gravity $27h$ of the horizontal blade and its weight from the rotor axis 19 may be determined by taking the moments of the blade mass and weight mass about the axis and dividing by the combined mass.

$$\text{Distance from 19 to } 27h = \frac{B(f+g)+Wa}{B+W} \quad (1)$$

The distance of the resultant center of gravity 27 of the blade standing at flapping angle A from rotor axis 19 may be determined in the same way.

$$\text{Distance from 19 to } 27 = \frac{B(f+g \cdot \cos A)+W(a+b)}{B+W} \quad (2)$$

If weight 23 is to move in the manner necessary to achieve its objective as previously outlined the above two distances must be equal. Equating the right hand sides of Equations 1 and 2, multiplying both by the common denominator and subtracting identical terms from the two sides of the equation, we have:

$$Bg = Bg \cdot \cos A + Wb \quad (3)$$
$$Wb = Bg(1 - \cos A) = Bg \cdot \text{vers } A \quad (4)$$
$$b = \frac{Bg}{W} \cdot \text{vers } A \quad (5)$$

This Equation 5 indicates that the objectives previously outlined will be attained if the weight 23 is constrained to so move that, as the blade is rocked upward from the horizontal to any flapping angle A above the horizontal, the weight will move horizontally outward by a distance equal to the versed sine of the angle A multiplied by the distance of the center of gravity of the blade proper from the flapping hinge increased in the ratio that the mass of the blade proper bears to the mass of the compensating weight. It will be noted that if the mass of the weight is decreased relative to that of the blade the required stroke of the weight is increased in the same ratio.

In order to more clearly show the nature of the movements involved, the diagrammatic showings of Figures 1 to 3 inclusive, have shown the blades at relatively large flapping angles and have proportioned the movements as though each compensating weight had a mass something like half as great as that of the blade proper. However, in order to minimize both the mass and stroke of the weight it is desirable in actual practice to limit the flapping angle to not in excess of 15° or thereabouts. An average coning angle of approximately half this value is quite usual, so that by taking steps to minimize the departures therefrom the maximum flapping angle ordinarily encountered may be held well below 15°. For flapping movements not exceeding 13°, the mass of each compensating weight may in embodiments of my present invention be held to less than 10% of that of the blade proper without involving excessive stroke of the weight.

*First embodiment of the invention*
*(Figures 4, 5, and 6)*

ROTOR CONSTRUCTION AND DRIVE

One embodiment of the invention is illustrated in Figures 4 to 6, inclusive. As particularly shown in Figure 5, each blade 17 comprises a skin or covering 34 integrally mounted on ribs 35, which in turn are integrally attached to a tubular blade spar 36, which spar terminates inwardly in a bearing retainer 37 containing a ball thrust bearing 33 co-axial with the spar. This bearing serves to attach the blade to a connecting link 38 in a manner permitting of the blade being rotated about the spar axis relative to the link 38, to effect changes in the pitch setting of the blade.

Such changes in the pitch settings of the blade may be effected by any mechanism of the type customarily used in helicopters for such a purpose, or by mechanism such as that illustrated in Figure 12 of the drawings of my copending application to which reference has been made.

The connecting link 38 is in turn attached by means of a flapping hinge 24 to lugs 39 integral with a hub member 40. The hub member 40 is in turn pivotally mounted by means of roller bearings 41 and 42, for rotation about a cylindrical member 43 fixed in the framework of the craft, and about a co-axial cylindrical member 44 which is attached to the member 43 by means of a plurality of bolts 45. Attached to the bottom of the hub member 40 by means of a plurality of bolts 46 is a ring 47 having downwardly extending lugs 48 for receiving the roller bearings 41. A spherical roller thrust bearing 49 is interposed between the ring 47 and the cylindrical member 44, thus serving to transmit to the framework of the craft, the upward thrust of the hub member 40, which is primarily the force which sustains the craft in flight. Attached to the top of the hub member 40 by means of a plurality of bolts 51 is a ring 52. Interposed between this ring and a flange 53 of the cylindrical frame member 44 is a ball thrust bearing 54, which serves to sustain the rotor when it is not exerting an upward lift on the craft.

The drive for the rotor comes from an engine shaft 56 through a conventional form of hydraulic coupling 57 to a transmission shaft 58; which shaft is guided in the upper surface 59 of the cylindrical frame member 43. Integral with the upper end of shaft 58 is a gear 61 which meshes with an idler gear 62, which idler gear is rotatably mounted on a stud 63 which is integrally mounted in the member 43. The idler 62 in turn meshes with teeth 64 cut into the inner face of the hub member 40. The hub member 40 is thus rotated upon the fixed cylindrical members 43 and 44. The effect of a master drag hinge is secured by this arrangement, since the hydraulic coupling 57 offers little resistance to minor angular readjustments between the engine and the rotor whether such readjustments are required to smooth out irregularities in the driving movement transmitted by the engine or to permit the blades to respond in limited degree to irregular air conditions encountered.

In the prior art construction displacement of any blade about its individual drag hinge, unless accompanied by identical displacement of the other blades, altered the location of the center of gravity of the rotor and because of the upward slant of the blade altered the effective tilt of the rotor. These alternations in center of gravity location and tilt might be desired alterations required for proper operation of the craft of prior art types or they might be unwanted alterations introduced by disturbances or irregularities of one kind or another and might very adversely affect the smooth operation of the craft. Therefore, in the prior art construction the use of means for centralizing the blades on their individual drag hinges or retarding their movement about such hinges had to be provided very cautiously and were never very satisfactory, for the centralizing means always prevented the desired displacements reaching their full proper values, while the retarding means, if any, tended to cause the undesired displacements to persist long enough to produce very adverse effects and to unduly delay the proper readjustment of desired displacements. However, in my arrangement the displacement of the blades about their common drag hinge does not produce any change in the location of the center of gravity of the rotor nor any change in its effective tilt, and therefore does not produce any of the adverse effects above mentioned. Therefore, the hydraulic coupling may be designed to give the maximum of rotational smoothness to blade movement without having to be concerned with other effects, as in the prior art.

*Compensating weights and hydraulic operating means therefor*

This embodiment of the invention as illustrated in Figures 4 to 6 inclusive, is shown as comprising a three bladed rotor wherein hydraulic means are utilized to position the compensating weights. As indicated in Figures 4 and 5, three compensating weights, 22, 23, and 25, are slidably mounted in hydraulic cylinders 70, 71, and 72, respectively. As indicated in Figures 4 and 5, each of these cylinders is disposed in a different horizontal plane and extends diametrically across the hub 16, and each is in radial alignment with one of the three blade spars 36. Located within each of these cylinders at its end adjacent to the blade with which it is in alignment is a spring 74 adapted to engage the compensating weight whenever the weight approaches that end of the cylinder. In each cylinder the end thereof in which spring 74 is located is vented to the atmosphere through a hole 75 (Fig. 5), while all space within the cylinder on the opposite side of the compensating weight is filled with hydraulic fluid, the flow of which is controlled as hereinafter described. Each compensating weight 22, 23, 25 comprises means for sealing off the hydraulic fluid so that the weight acts as a hydraulic piston. The purpose of each spring 74 is to avoid negative pressure on the hydraulic fluid at the opposite end of the cylinder. For instance, if the compensating weight 23 is forced by the pressure of the hydraulic fluid toward the right until it moves to the right of rotor center, as viewed in Figure 4, the spring 74 in cylinder 71 will commence to exert a leftward pressure on the weight before its center of gravity passes to the right of the center of the rotor, thus insuring that weight 23 will return to the left as the pressure on the hydraulic fluid is released; the pressure of spring 74 continuing until weight 23 is far enough left of center so that centrifugal force will insure its further leftward travel in response to further release of hydraulic pressure.

Hydraulic fluid for effecting and controlling the reciprocation of each compensating weight 23 in its cylinder 71 is fed to the left end of cylinder 71 (Fig. 4) through two tubes 77 and 78. Tube 77 is connected through a branch 79 with the outer end of a cylinder 80, in which a piston 81 (Fig. 5) is moved outwardly (by mechanism to be hereinafter described) in proportion to the versed sine of the flapping angle of the associated blade. Tube 77 is also connected to the inner end of a cylinder 82 by a branch 83. The similar piston 81 in cylinder 82 is displaced in the same relation to the flapping angle of its associated blade as is the piston 81 in cylinder 80 in relation to the flapping angle of its associated blade, as previously mentioned. Therefore if the blade 91 associated with cylinder 80 is rocked upward from the horizontal to flapping angle $A_1$ and the blade 92 associated with cylinder 82 is rocked upward from the horizontal to flapping angle $A_2$, the consequent movement of the pistons 81 in cylinders 80 and 82 will cause tube 77 to feed into the left end of cylinder 61 an amount of hydraulic fluid proportional to vers $A_1$ minus vers $A_2$.

The outer end of cylinder 71 is also connected by a symmetrically similar arrangement, comprising a tube 78 and its respective branches 85 and 86, with a cylinder 87 (the piston in which is positioned in accordance with the versed sine of flapping angle $A_1$, just like cylinder 80) and with a cylinder 88 (the piston in which is positioned in accordance with the versed sine of the flapping angle $A_3$ of the third blade 93). Thus if the rocking of the blade 91 from the horizontal to flapping angle $A_1$ is accompanied by rocking of the blade 93 from the horizontal to the flapping angle $A_3$, tube 78 will feed into the left end of cylinder 71 an amount of hydraulic fluid proportional to vers $A_1$ minus vers $A_3$. Hence if the three blades are simultaneously rocked up from the horizontal to the flapping angles $A_1$, $A_2$, and $A_3$, respectively, the total fluid fed into the left end of cylinder 71, and consequently the total rightward displacement of compensating weight 23, will be proportional to:

$$2 \text{ vers } A_1 \text{ minus vers } A_2 \text{ minus vers } A_3 \quad (6)$$

wherein the flapping angle $A_1$ is that of the blade 91 in line with cylinder 71 and flapping angles $A_2$ and $A_3$ are those of the other two blades.

It will be observed from the above Formula 6 that if all three blades stand at the same flapping angle so that $A_1=A_2=A_3$ the weight 23 will stand in the same position as when all three blades are horizontal. Since the symmetrical rocking up of all three blades does not disturb the center of gravity of the rotor it is desirable that the compensating weights should not be disturbed by such symmetrical rocking. The arrangement disclosed causes movement of the compensating weights only to compensate for differences between the flapping angles of the three blades.

As shown in Fig. 4, each of the other cylinders, 70 and 72, which carry compensating weights are connected to pump cylinders operated by the three respective blades in a manner exactly corresponding to that above described in connection with cylinder 71; the arrangement in each instance being such that the end of the compensating weight cylinder furthest removed from its associated blade is connected to the outer ends of both the pump cylinders operated by the flapping of that associated blade, and to the inner end of one of the two pump cylinders operated by the flapping of each of the other two blades. Hence if, as previously, we use the subscript "1" to refer to the blade 91, the subscript "2" to refer to the blade 92, and the subscript "3" to refer to the blade 93, the total net fluid fed into cylinder 70 as the blades are rocked up from the horizontal to the flapping angles $A_1$, $A_2$, and $A_3$, respectively, and consequently the total net displacement of compensating weight 22, will be proportional to:

$$2 \text{ vers } A_2 - \text{vers } A_1 - \text{vers } A_3 \quad (7)$$

That is the same blade movement which, as previously noted, displaces compensating weight 23 in accordance with Formula 6 displaces compensating weight 22 in accordance with Formula 7. This same movement of the blades will also displace compensating weight 25 by an amount proportional to:

$$2 \text{ vers } A_3 - \text{vers } A_1 - \text{vers } A_2 \quad (8)$$

All three of the compensating weight cylinders 70, 71, and 72 are of the same size, and all six of the pump cylinders 80, 82, 87, 88, etc. are identical in size and therefore the factor of proportionality applying to all three Formulas 6, 7, and 8 is the same, that is the amount of movement of the compensating weight for a given change in the value of the related formula is the same in all three cases. Therefore, if blades 92 and 93 were left in horizontal positions ($A_2=A_3=0$) and blade 91 rocked up to flapping angle $A_1$, it is evident from Formula 6 that compensating weight 23 will move rightward (as viewed in Fig. 4) by an amount proportional to twice the versed sine of angle $A_1$, compensating weight 22 diagonally upward toward the right by half this amount, and compensating weight 25 diagonally downward toward the right by the same distance that weight 22 moves. Since the path of movement of weight 22 will be displaced in plan 60° in one direction from that of weight 23, and the path of movement of weight 25 displaced 60° in the other direction, the component of movement of weights 22 and 25 perpendicular to the path of movement of weight 23 will be equal and opposite and cancel each other in effect, while the component of movements of each of the weights 22 and 25 in the direction of the path of movement of weight 23 will be directed in the same direction as the movement of weight 23 and will be one quarter as great as the amount of movement of weight 23. It is one quarter as great, owing to the fact that the amounts of movement of weights 22 and 25 are each one half as great as that of weight 23 and that the component of each such movement in the path of movement of weight 23 is equal to the amount of movement of the weight multiplied by the cosine of 60° which equals one half. Therefore when blade 91 is rocked, the resulting displacements of compensating weights 22 and 25 combined contribute a displacement in center of gravity of the rotor identical in direction and one half as great in amount as that contributed by the displacement of compensating weight 23.

The rocking of any one blade causes a corresponding pattern of displacement of all three weights, wherein all three compensating weights contribut to displacing the rotor center of gravity in a manner compensating for the displacement thereof caused by the movement of the blade center of gravity, the weight which travels in line with the horizontal projection of the blade always contributing twice as much as the other two weights combined. The fact that these other two weights are moved makes it possible to reduce each weight to ⅔ the mass that would otherwise be required. Also the movement of the pump pistons, such as piston 81, Fig. 5, and related parts are all in the proper directions to contribute a small proportionate part of the compensating displacement of the center of gravity. Furthermore, each compensating weight is arranged to have a free path of travel across rotor center which makes it feasible to provide quite a long path of travel without the weight moving far enough from rotor center so that centrifugal force exerted by the weight due to the rotation of the rotor is minimized. Due to thus utilizing all three weights supplemented by all six pistons to compensate for each unbalance, and providing a long path of travel for each weight, it is feasible with parts proportioned substantially as illustrated to utilize compensating weights each well under one-tenth of the weight of the associated blade, which added weight may be less than the saving in structural weight of the blade made possible by utilization of my invention.

*Mathematical determination of movements in triple compensating weight system*

While Equation 5 hereinabove, provides a definite rule for determining the stroke of a compensating weight of any given mass to eliminate vibration in a rotor of known blade mass and center of gravity, in case a single weight is moved to compensate for the movement of each blade, and Expressions 6, 7, and 8 are respectively proportional to the strokes of the three weights in a system in which each compensating weight is displaced by movements of all three of the blades, no determination has yet been set forth of the factor by which Expressions 6, 7 and 8 would each have to be multiplied to determine the actual amount of stroke of each compensating weight required in order to eliminate vibration in the case in which each compensating weight is displaced by movements of all three of the blades. In order to determine this:

Let $m$ = the factor by which Expressions 6, 7 and 8 must be multiplied to arrive at the proper amount of displacement for each of the respective compensating weights.

$W_c$ = the mass of each of the three compensating weights.

$W_1$ = the mass of some other member, such as lever 95, link 102, piston rods 103, etc., which is displaced by the flapping movement of the blade in a manner which affects rotor balance.

$f_1$ = the ratio that the movement (measured in the direction of movement of the primary compensating weight) imparted to mass $W_1$ by any given flapping displacement of a blade bears to the corresponding movement imparted to the primary compensating weight. That is any given blade displacement imparts to mass $W_1$ the $f_1$ fractional part of the effective displacement it imparts to its primary compensating weight.

$W_2 \ldots W_n$ = mass of the remaining members like $W_1$.

$f_2 \ldots f_n$ = the ratios like $f_1$ applying to the respective masses $W_2 \ldots W_n$.

$W_a$ = a single mass equivalent in its effect on balance to all the weights $W_1$ to $W_n$, inclusive.

$f_a$ = the displacement of $W_a$ expressed as a fraction of that of the primary compensating weight.

Then $$W_a f_a = W_1 f_1 + W_2 f_2 + \ldots W_n f_n \qquad (9)$$

This provides a simple expression for a single mass equivalent to all the masses which supplement the compensating weights in responding to and compensating for the movement of any one blade.

Using subscripts "1," "2" and "3" to refer to blades 91, 92 and 93, respectively, as previously, we ascertain from Expression 6 previously stated, and from the definition of $m$ above that each displacement of compensating weight 23 (the primary compensating weight for blade 91) will be equal to the change in value of the expression:

$$m(2 \text{ vers } A_1 - \text{vers } A_2 - \text{vers } A_3) \qquad (10)$$

and the displacement of the equivalent supplemental mass $W_a$ moved by blade 91 will be the $f_a$ fraction of the portion of this contributed by blade 91, namely the change in value of $$f_a m (2 \text{ vers } A_1) \qquad (11)$$

Similarly from Expression 7 the displacement of compensating weight 22 will be equal to the change in value of the expression $$m(2 \text{ vers } A_2 - \text{vers } A_1 - \text{vers } A_3) \qquad (12)$$

and the displacement of the equivalent supplemental mass $W_a$ moved by blade 92 will be equal to the change in value of $$2 f_a m \cdot \text{vers } A_2 \qquad (13)$$

Similarly from Expression 8 the displacement of compensating weight 25 will be equal to the change in value of the expression:

$$m(2 \text{ vers } A_3 - \text{vers } A_1 - \text{vers } A_2) \qquad (14)$$

and the displacement of the equivalent supplemental mass $W_a$ moved by blade 93 will be equal to the change in value of $$2 f_a m \cdot \text{vers } A_3 \qquad (15)$$

We may arrive at the value of $m$ by multiplying the value of the mass of each of the compensating and supplemental weights by the component of the displacement of the respective weights effective in a given direction, for instance toward the right in Fig. 4 and equating the sum of these products to the sum of the products obtained by multiplying the mass of each blade by the component of its corresponding displacement effective in the opposite direction. We will thus be equating the change in the moment of all compensating and supplementary weights about a chosen line to the opposite change in the moment of the blade masses about that same line, just as was done in Equation 4 for the case of a single compensating weight, for if these two moments are equal the center of gravity of the rotor remains undisturbed. This gives rise to the following equation:

$$W_c m (2 \text{ vers } A_1 - \text{vers } A_2 - \text{vers } A_3) + 2 W_a f_a m . \text{vers } A_1$$
$$- [W_c m (2 \text{ vers } A_2 - \text{vers } A_1 - \text{vers } A_3) + 2 W_a f_a m . \text{vers } A_2] \cos 60°$$
$$- [W_c m (2 \text{ vers } A_3 - \text{vers } A_1 - \text{vers } A_2) + 2 W_a f_a m . \text{vers } A_3] \cos 60°$$
$$= Bg(\text{vers } A_1 - \text{vers } A_2 . \cos 60° - \text{vers } A_3 . \cos 60°) \qquad (16)$$

Simplifying we obtain:

$$(1.5 W_c m + W_a f_a m)(2 \text{ vers } A_1 - \text{vers } A_2 - \text{vers } A_3) = Bg(\text{vers } A_1 - 0.5 \text{ vers } A_2 - 0.5 \text{ vers } A_3) \qquad (17)$$

$$(3 W_c + 2 W_a f_a) m = Bg \qquad (18)$$

$$m = \frac{Bg}{3 W_c + 2 W_a f_a} \qquad (19)$$

By substituting the value of $m$ from Equation 19 in Expressions 10, 12, and 14 the movement of each compensating weight is obtained in terms of dimensions and weights which will be known in any given design, and the parts disclosed in Figs. 4, 5, and 6 are shaped and proportioned to cause the compensating weights to move in accordance with the following three equations. The movement of compensating weight 23 is thus given by the change in value of the expression $$\frac{Bg}{3W_c+2W_af_a}(2 \text{ vers } A_1 - \text{vers } A_2 - \text{vers } A_3) \quad (20)$$

that of compensating weight 22 by the change in value of $$\frac{Bg}{3W_c+2W_af_a}(2 \text{ vers } A_2 - \text{vers } A_1 - \text{vers } A_3) \quad (21)$$

and that of compensating weight 25 by the change in value of $$\frac{Bg}{3W_c+2W_af_a}(2 \text{ vers } A_3 - \text{vers } A_1 - \text{vers } A_2) \quad (22)$$

The foregoing three Expressions 20, 21, 22, express a relationship which is fundamentally the same as that of Equation 5 hereinbefore, except that Equation 5 covers the case of displacing a single compensating weight by flapping movement of a single blade. To prove this identity let us replace by a single weight W all weights moved by a single blade. Since the two secondary compensating weights $W_c$ supply a combined effect equal to one half that of the primary weight $W_c$ and all other weights moved by a single blade give an effect equivalent to $W_a f_a$, therefore $$W = 1.5 W_c + W_a f_a$$

Therefore the denominator of the above Expressions 20, 21, and 22 ($3W_c + 2W_a f_a$) is equal to $2W$. Substituting this value in Expression 20, and dropping out the functions of the flapping angles $A_2$ and $A_3$, since we are considering the effect of changes in $A_1$ only, and if $A_2$ and $A_3$ are constant they will have no effect on the change of value of the expression, Expression 20 becomes $$\frac{Bg}{W} \text{ vers } A_1$$

which is, in effect, identical with Equation 5, and indicates that if the component weights are displaced in accordance with Expression 20 the resultant of this component weight will be displaced by the movement of a single blade in accordance with Equation 5. Exactly the same treatment of Expressions 21 and 22 will, of course, indicate exactly the same result for each of the other two blades.

The means whereby it is made possible for each blade to actuate the pistons in its two hydraulic pump cylinders in proportion to the versed sine of the flapping angle is particularly illustrated in Fig. 5. This means includes, in conjunction with each blade, a lever 95, pivotally mounted on a pin 96; which pin is integrally mounted in a forked arm 97 integral with the hub member 40. Pivotally mounted on the lever 95 are two coaxial rollers 98 (only one of which is shown in Fig. 5), mounted on a common pin 99, the two rollers being located adjacent the two opposite faces of lever 95. The connecting link 38 at the root of each blade comprises downwardly extending arms 100 which straddle the lever 95 (see Figs. 4 and 5). In the lower part of each of the arms 100 is a curved slot 101 embracing one of the rollers 98. The slots 101 in the two arms 100 integral with each root link 38 are identical in outline and constitute variable-rate cams, their shape being such that as the blade is rocked upward from the horizontal to any flapping angle A, the action of the slots 101 on the rollers 98 will cause the lever 95 on which the rollers are mounted to rock in such a manner that, acting through a link 102 pivotally connected to the lever 95 and piston rods 103 carried by said link, it will cause the pistons 81 in the two associated cylinders to move rightward (as viewed in Fig. 5) by an amount proportional to the versed sine of the flapping angle A, thereby pumping out of the right end of these two pump cylinders and into the left end thereof amounts of hydraulic fluid proportional to the versed sine of the flapping angle.

*Means for initially adjusting stroke and establishing rotor balance*

Heretofore, it has been necessary to go to great expense in exercising extremely meticulous care in the building of rotor blades, particularly for articulated rotors, to secure extreme exactness in total mass, mass distribution, and airfoil shape so as to avoid the disturbances of rotor center of gravity which may arise as a direct or indirect effect of discrepancies between these attributes of various blades in a given rotor. Because differences in flapping angle do not disturb rotor center of gravity when my invention is employed rotor balance, if once established, will be automatically maintained, and because of the elimination of individual drag hinges my rotor does not like many articulated rotors of the prior art, permit minute errors in rotor balance to produce blade displacements which cause large disturbances of balance. Therefore my invention makes it possible to build the individual blades without any highly exact control of blade mass or shape, thereby securing lower production cost, and making it possible to employ types of construction which would not lend themselves to the previous exacting requirements.

However, if full advantage is taken of the freedom in blade construction thus rendered available, some convenient means must be provided for initially bringing the rotor into proper balance to compensate for the inequality between the centrifugal force on the respective blades, and means must also be provided to correct for errors in the ratio of movements of the compensating weights to the versed sines of the flapping angles causing them.

The reason for this latter correction can be appreciated by reference to Equation 5 hereinabove, which equation indicated that the movement of the compensating weight, if a single compensating weight were moved, would be equal to $$\frac{Bg}{W} \cdot \text{vers } A$$

wherein

B = mass of blade
W = mass of compensating weight, and
g = distance from flapping hinge to the center of gravity of the blade.

If, as in the actual embodiment disclosed, a plurality of compensating weights are moved to compensate for the flapping movement of a single blade, each moving in fixed ratios to the movements of the other weights, any increase or decrease in the values of B, W, or g will require proportionate change in the movements of all compensating weights to maintain balance. Since errors in blade manufacture may cause variations in the values of B and/or g, means must be provided to alter the amount of movement of the compensating weights produced by any given change in blade flapping angle, if we are to avoid the necessity for accurately controlling the amount and distribution of the mass of the blade.

In order to provide for such an adjustment, the lever 95 is connected to the link 102 by an eccentrically adjustable pivotal connection indicated in Figure 5, and shown in greater detail in Figure 6. As there shown a bolt 106 extends through co-axial holes in two rightwardly extending arms 107 of the link 102. A shouldered portion 108 of this bolt fits freely into one of these holes, while a plain sleeve 109 slipped over the bolt fits in the other. Slipped over the bolt therebetween the shoulder 108 and the sleeve 109 is a flat washer 113 and also an eccentric sleeve 110 carrying integrally with it an hexagonal flange 111. The outer diameter of the eccentric portion of the sleeve 110 fits into a hole in the top portion of the lever 95, and the length of this eccentric portion is slightly less than the thickness of the lever 95 to insure that the eccentric sleeve 110 will be clamped in fixed relation to the lever upon screwing down of a nut 112, with which the bolt is provided. This screwing down firmly clamps the sleeves 109 and 110, the lever 95 and the washer 113, against the shoulder so that they cannot be rotated relative to each other. By loosening the nut 112 the hexagonal flange 111 may be rotated to bring the eccentric sleeve 110 into any desired angular position, following which it may be locked in that position by tightening the nut.

The pivotal connection of lever 95 to link 102 is established by virtue of the fact that shoulder 108 and sleeve 109 are always free to turn in their mating holes in arms 107. It will be observed that this pivotal connection is always co-axial with bolt 106. As will be particularly evident from Figure 5 the effective length of the lever 95 from its pivot pin 96 to the bolt 106 is altered by the rotation of the eccentric sleeve 110, thus altering the amount of movement imparted to the pistons and hence to the compensating weights by any given movement of the blade and of the lever 95. By weighing each blade and measuring the location of its center of gravity the proper length of the lever 95 can be computed for producing exactly the proper stroke of the pistons 81 positioned by that particular blade, whereupon the eccentric connection between the lever 95 and link 102 related to that blade can be adjusted and permanently locked to give this effective length of lever.

The rotation of the eccentric sleeve 110, as above described, will in addition to adjusting the effective length of lever 95, as above mentioned, also move the pistons 81 in their cylinders and hence readjust the compensating weights. Since these two adjustment effects are not independent of each other it will, in general, be impossible to bring them simultaneously to their desirable respective adjustments by rotation of the eccentric sleeve. Therefore a separate adjusting means is provided to adjust the position of each compensating weight so as to initially establish proper rotor balance, correcting for initial errors in the mass and center of gravity locations of the blades, as well as for the effect that the adjustment of the eccentric sleeves 110 may have had on the positions of the compensating weights.

This separate adjusting means for each compensating weight comprises a means for changing the capacity of the hydraulic system which positions each weight. For this purpose there is connected into each of the three hydraulic systems which position the three compensating weights 22, 23 and 25, a weight adjustment cylinder 120 (Fig. 4). Each cylinder 120 is provided with a screw member 121 which may be screwed any desired amount into the cylinder and locked by a nut 122. The inner end of screw member 121 preferably terminates in a hydraulic seal or in so close a fit into the mating portion of cylinder 120 as to effectively cut off hydraulic flow. Thus any inward adjustment of screw 121 displaces a certain amount of hydraulic fluid which through the connecting tubing causes an equal amount to flow into the respective cylinder 70, 71 or 72 and to correspondingly displace the respective compensating weight 22, 23 or 25.

With the adjusting arrangements above described no accurate control need be exercised over the mass or center of gravity location of each blade, for after the blades have been completed these two values can be readily measured for each blade and the related eccentric sleeve 110 correspondingly adjusted and permanently locked. When the assembly of the rotor is complete it may then be placed on a fixture on which it can be rotated and the location and amount of the rotor unbalanced noted, such fixtures being well known in connection with the balancing of rotors in many kinds of machinery. Screws 121 may then be adjusted to compensate for the unbalance noted, following which it may be desired to recheck and verify the rotor balance. As soon as the balance is satisfactory screws 121 may be left permanently locked by nuts 122, and the automatic positioning of compensating weights 22, 23 and 25 will thereafter automatically maintain the rotor in balance.

Prevention of blade "droop"

In order to prevent the "droop" of the blades, which as previously mentioned is characteristic of prior art rotors, particularly those of the articulated type, I prefer to mount beneath each flapping hinge a spring 125 (see Figs. 4 and 5) seated on a stud 126 in the hub member 40 and engaging (at least when the blade is in the lower part of its range of flapping angles) a crosspiece 127 integral with the blade root link 38. This spring may, if desired, be made only strong enough to raise the blade when it is moving so slowly that its weight becomes of more consequence than the aerodynamic and centrifugal forces acting on it. Under such an arrangement the spring would exert a negligible effect as compared with the large aerodynamic and centrifugal forces acting on the blade during flight, but with a stationary or slowly rotating rotor, at which time the "droop" of the blades appears in the prior art rotors, and causes the dangers and difficulties previously mentioned, the spring is effective to rock the blades upward about their flapping hinges, thus eliminating the "droop" and entirely avoiding the disadvantages associated with it.

Alternatively the springs 125 may be made considerably stronger than above mentioned, and arranged to be effective over the major portion of the range of flapping angles of the blades. In such a case they may serve the purpose of increasing the controlling effect of rotor tilt on the craft, thus increasing the range within which the center of gravity of the craft must be located to preserve proper maneuverability of the craft in flight.

*Operation in case of excessive blade movement*

In order that no serious damage to the mechanism will result if, for any reason, during flight or otherwise, a blade should be rocked up to a greater flapping angle than that for which the compensating apparatus is constructed, the portion 117, Fig. 5, of the bottom surface of each arm 100 is made arcuate about the center of flapping hinge 24. Also the main cross-tie 118 between the two arms 100 of root link 38 is so shaped as to prevent lever 95 from rocking much further clockwise than the position to which it is rocked by surface 117 when the blade is rocked high enough to bring that surface into contact with roller 98. Thus, if the blade is rocked up from the position in which it is shown in Fig. 5, a slight further clockwise rocking of lever 95 from the position shown will take place, following which the blade may be rocked up through a very large angle without any appreciable further rocking of lever 95 ensuing, but as the blade rocks back down roller 98 will be constrained to again enter slot 101 and the normal action of the compensating apparatus will always take place for the normal range of rock of the blade. If the blade should be rocked high enough to thus bring roller 98 out of slot 101 during flight, vibration of the nature that this invention is designed to eliminate will commence to appear, but will disappear as soon as the blade returns to its normal zone of movement. If some unusual disturbance should thus cause the blade to operate outside its proper range of flapping angles during flight, it is preferable that such vibration should appear rather than that either the blade or the compensating mechanism be permanently damaged in an effort to prevent the movements from passing outside such a range.

Also the mass of the compensating weights may be very appreciably reduced by adopting such a construction as that just described. The required mass of the compensating weight for any given maximum stroke thereof increases rather rapidly with increases in the maximum flapping angle for which the weights are designed to provide full compensation. Therefore if the mechanism were arranged to provide full compensation for the greatest flapping angle that might ever be encountered under the most unusual conditions, the weights would have to be very appreciably heavier than with an arrange such as that disclosed wherein they only provide such compensation for a range of flapping angles including the greatest flapping angle ordinarily encountered in flight. By so arranging it that the weights constructed in this latter manner are held substantially at their maximum displacement for all flapping angles in excess of that for which they provide full compensation, the vibration encountered under the unusual circumstances when the normal range of flapping angles is exceeded is held to a minimum.

*Second embodiment of the invention (Figures 7 to 15, inclusive)*

ROTOR AND DRIVE CONSTRUCTION

Figures 7 to 15, inclusive, illustrate a second embodiment of the invention which differs from the first embodiment illustrated in Figures 4 to 6, inclusive, in that the hydraulic means which is utilized in the first embodiment for positioning the compensating weights is replaced by mechanical means, and also in that each compensating weight in the second embodiment is associated with only one blade and is positioned solely in accordance with the flapping angle of that particular blade.

Each compensating weight in this embodiment will, therefore, be displaced in accordance with Equation 5, previously developed in connection with Figure 3:

$$b = \frac{Bg}{W} \text{vers } A \qquad (5)$$

This relationship may, however, be further elaborated by distinguishing between the mass of the compensating weight per se and that of the other displaced masses, as was done in the first embodiment. We may, as previously, let $W_c$ = mass of each compensating weight per se.
$W_a f_a$ = equivalent mass of remaining displaced parts, as previously defined in Equation 9.

Then in this instance
$$W = W_c + W_a f_a \qquad (23)$$

Combining Equations 5 and 23 we obtain as the more complete expression of the relationship controlling the movement of the compensating weights of this embodiment:

$$b = \frac{Bg}{W_c + W_a f_a} \text{vers } A \qquad (24)$$

As is evident from Figures 7 and 8 the hub and blade construction of this embodiment is identical with that of the first embodiment except for the compensating weights and weight displacing means. The hub mounting and drive arrangements are also identical with that shown in Figure 5. In order that the correspondence between certain parts of this embodiment and the respective parts of the first embodiment will be the more readily apparent the parts of this embodiment which correspond closely to parts of the first embodiment are identified by numbers which are respectively the same as those used to identify the corresponding parts of the first embodiment, except that in this embodiment a prime mark (') is placed after each such number used in this embodiment. Thus the three compensating weights of this embodiment are identified as 22', 23', and 25', respectively, to indicate correspondence to the compensating weights 22, 23, and 25, respectively, of the first embodiment, and this has been done in spite of of the fact that the three compensating weights of this embodiment differ very considerably in shape and manner of mounting and operation from the corresponding compensating weights of the first embodiment. All other parts to which corresponding numbering has thus been applied are substantially identical with the parts of the first embodiment to which they respectively correspond, and their construction and manner of operation will be clear from the description previously made of the construction and manner of operation of the corresponding parts of the first embodiment.

*Compensating weights and mechanical operating means therefor*

The compensating weight 22' is positioned by the blade 92', compensating weight 23' by the blade 91' and compensating weight 25' by the blade 93', in accordance with the versed sine of the flapping angle of the respective blade.

The manner in which each compensating weight receives movement in accordance with the versed sine of the flapping angle of its respective blade corresponds very closely to the manner in which the pistons of the hydraulic pump receive such movement in the first embodiment. A link 102' (Fig. 8) is positioned by the blade exactly as the link 192 is positioned (Fig. 5). Link 102' is pivotally connected by a pin 196 (Fig. 8) to a bar 197 which is clamped to a rack 198 so that the two normally act as a single integral member, this combined member being shown in detail in Figures 14 and 15. Rack 198 which is reciprocably mounted on a guide 199 is, therefore, positioned in accordance with the versed sine of the flapping angle of the related blade, just as the pistons of the hydraulic pump were positioned in the first embodiment. As particularly shown in Figs. 9 and 10, the rack 198 meshes with a gear 200 which is pivotally mounted on a vertical stud 201 which is supported in the rotor cap ring 52'.

As indicated in Figures 9 and 10 the gear 200 meshes with a gear 202 which is rotatably mounted on a stud 203 and is integral with a gear 204, which in turn meshes with a gear 205 rotatably mounted on a stud 206 and integral with a sprocket 207. The interposing of the compound gear 202—204 between the gear 200 and the gear 205 combined with the fact that the sprocket 207 is of a large diameter as compared to the gear 205 serves to displace the pitch line of sprocket 207 at a large multiple of the rate of displacement of the gear 200 by the rack 198. Mounted on this sprocket 207 is a continuous, flexible movement transmitting device, illustrated as consisting of a chain 210, which as indicated in Figure 7, extends almost diametrically across the rotor hub and passes around another sprocket 211 which is rotatably mounted on a stud 212 at the opposite side of the rotor hub.

As indicated in Figure 7 one such chain 210 is associated with each blade and is displaced thereby through a corresponding rack 198 and related gearing. Since the paths of the chain cross each other they must be located at different levels. Also it is desirable that the respective compensating weights be located at different levels so that their respective paths of movement may also cross each other, thus making it possible for each weight to move across rotor center on a diameter of the rotor hub, thereby providing for each weight a long available path of movement without carrying it far enough from rotor center to incur large centrifugal force. Each chain 210 is therefore located in the same vertical plane as its associated compensating weight, these respective planes of movement being superimposed on each other in a manner that is readily apparent from Figures 7, 9, 10, and 11.

As indicated in Figure 10, the weight 23' and its associated chain 210 is located at the highest of these levels, the weight 23' being reciprocably mounted on a guide 223 integrally supported above rotor cap ring 52' by means of two brackets 215, as also indicated in Figure 8. As indicated in Figure 11 the corresponding guide 225 on which the compensating weight 25' is reciprocably supported is located at the lowest of these three levels by utilizing an appropriately shorter bracket 215, and the chain 210 associated with weight 25' is located correspondingly lower than the one associated with the weight 23' by making correspondingly shorter the sleeve 208 which integrally connects gear 205 to sprocket 207. As indicated particularly in Figure 8, the remaining compensating weight 22' and its supporting guide 222 are located at a level intermediate those of the other two compensating weights 23' and 25', and this is accomplished by providing, in connection with that compensating weight, brackets 215 and a sleeve 208 which are intermediate in height between those shown in Figure 10 and those shown in Figure 11.

*Manner of attaching chains to compensating weights (Figures 12 and 13)*

Each chain 210 is connected to its respective compensating weight 25', 22' or 23' by an arrangement which permits the weight to travel through a greater maximum stroke than the length of the chain loop. This arrangement is shown in detail in Figures 12 and 13, which illustrate the attachment of compensating weight 23' to its associated chain 210, but the arrangement there illustrated is typical of the attachment of each compensating chain to its respective weight. As there illustrated a stirrup shaped member 240, having an ear 241 above chain 210 and an ear 242 below it, is attached by means of pin 246 to the chain 210. Integrally attached to the stirrup 240 is a flexible steel ribbon 247 the opposite end of which is integrally attached to a strip 248 and clamped to compensating weight 23' by means of screws 249. There is also attached to chain 210 by means of pin 251 another stirrup shaped member 252, exactly like member 240 but turned in the opposite longitudinal direction of the chain. Integrally attached to the stirrup 252 is a second flexible ribbon 253, which as particularly indicated in Figure 13 is located at a higher level than the ribbon 247. At its opposite end the ribbon 253 is integrally attached to a strip 254 and attached to the compensating weight 23', near the opposite end thereof, by means of screws 255.

In the above described arrangement for attaching compensating weight 23' to its associated chain 210, the ribbon 247 serves to prevent leftward movement of weight 23' relative to the chain 210. Similarly the ribbon 253 prevents rightward movement of weight 23' relative to the chain 210, and does this equally well whether pin 251 is located in a straight portion of the chain or passes up around sprocket 211 as illustrated in Fig. 12. Because of the fact that the ribbons 247 and 253 are at different levels, and that only ribbon 247 is attached to stirrup 240, this stirrup 240 is free to run up around the sprocket 207 at the opposite end of the chain loop and will still serve to prevent leftward movement of weight 23' relative to chain 210 whether stirrup 240 is located in a straight portion of the chain or passes up around the sprocket. Hence the entire arrangement is such that weight 23' is constrained to move at all times in unison with the adjacent portion of chain 210 but is free to thus move in each direction until almost the entire weight extends beyond the end of the straight portion of the chain. This embodiment therefore permits of longer strokes and hence even lighter compensating weights than the first embodiment.

*Means for adjusting stroke and balancing rotor*

Just as described in connection with the first embodiment the eccentric 110' (Fig. 8) of this embodiment is intended to be adjusted to alter the effective length of lever 95' to compensate for departures from the designed value of blade mass and blade center of gravity location. Also as in the first embodiment, separate means are provided to initially centralize the center of gravity of the rotor by adjustment of the compensating weights. For this purpose each rack 198 is adjustably connected to its respective bar 197 through which it is connected to its displacing lever 95'.

This adjustable connection is shown particularly in Figures 14 and 15. Two threaded pins 260 integral with rack 198 extend upwardly through two elongated slots 261 in bar 197, and are provided with washers 262 and nuts 263 for clamping bar 197 to rack 198. When these nuts are loosened, rack 198 may be moved longitudinally relative to bar 197, but such movement is controlled by an adjusting screw 265 mounted in a threaded hole in a lug 266 which is integral with and extends upwardly from rack 198. The screw 265 is provided with a hexagonal head 267, and the entire screw is just long enough to fit freely between two lugs 268 integral with the bar 197 and located at the opposite ends of a rectangular opening 269 through that bar. The screw 265 is further provided with two locking nuts 270 and 271, both of which must be loosened to permit of rotation of the screw 265 and consequent adjustment of the rack 198 longitudinally of the bar 197 to readjust the compensating weights, and thereby effect initial balance of the rotor. When the proper adjustment has been effected, the nut 270 should be screwed up against the lug 266, thus locking the screw in adjusted position and taking up any slack in the threaded fit of the screw 265 in the lug 266, and the nut 271 also should be screwed up against the lug 268, thus taking up any slack in the fit of the screw 265 between the two lugs 268. This results in firmly locking the rack 198 in the desired longitudinal relationship to the bar 197 without depending solely upon the frictional grip set up by the subsequent tightening of the nuts 263.

*Third embodiment of the invention (Figure 16)*

APPLICATION OF THE INVENTION TO A TWO-BLADED ROTOR

While the two foregoing embodiments of the invention illustrated in Figs. 4 to 6, and in Figs. 7 to 15, respectively, each is specifically shown as applied to three bladed rotors, the invention is also applicable to rotors with any other number of blades.

Figure 16 is a cross-section of a two-bladed rotor embodying the invention. For simplicity of disclosure the compensating weight 22" of this embodiment is shown as positioned by hydraulic means generally similar to that of the first embodiment but it will be clear that mechanical means generally similar to that of the second embodiment might equally well be employed, by employing a planetary differential to combine the movements imparted by the two blades.

Except for the difference in the number of blades and certain differences in the compensating weight mechanism as noted below, the construction and manner of mounting of the hub and the blades are identical with that of the two preceding embodiments, and similar parts are therefore identified with the same numerals as in the preceding embodiments except that the numerals in this embodiment are followed by a double prime mark ("). Unless otherwise noted, it is to be understood that the parts so designated are constructed and function exactly like the similarly numbered parts of the two preceding embodiments.

Just as in the first embodiment the flapping movement of each blade displaces a pair of pistons 81" reciprocable in a pair of cylinders 80" in accordance with the changes in value of the versed sine of the flapping angle of the blade. One of these pistons and cylinders is shown in connection with each blade in Fig. 16, and the other is hidden directly behind it. It would be equally possible in this third embodiment to dispense with one cylinder and piston in connection with each blade, by correspondingly enlarging the remaining cylinder and piston and choosing a location for it that would not conflict with the location of the cylinder 70" which carries the compensating weight 22", but as illustrated, the cross section illustrated in Fig. 16 corresponds exactly to that of Fig. 5 of the first embodiment and the cylinder 70" which carries the compensating weight is nested partially down between each of the two pairs of cylinders 80". A connecting tube 280 leads from the right or outer end of both the right hand pump cylinders 80" operated by blade 91" and from the right or inner end of both the left hand pump cylinders 80" operated by blade 92" into the left hand end of compensating weight cylinder 70" to deliver hydraulic fluid for displacing compensating weight 22" rightward in proportion to the rightward movements of the respective piston 81". Similarly tube 281 leads from the left end of all four pump cylinders to the right end of cylinder 70" to deliver hydraulic fluid for displacing compensating weight 22" leftward in proportion to the leftward movements of the respective pistons 81".

Thus in the case of this two bladed rotor (and the same thing could be done in connection with each pair of diametrically opposite blades in case of any rotor having an even number of blades) the single compensating weight is displaced in proportion to the change in value of the expression $$\text{vers } A_1 - \text{vers } A_2 \qquad (25)$$

wherein $A_1$ and $A_2$ are the flapping angles of the two respective blades. More specifically the displacement is equal to the value of the expression $$\frac{Bg}{W_c + W_a f_a}(\text{vers } A_1 - \text{vers } A_2) \qquad (26)$$

each of the symbols in this formula having the meaning heretofore indicated in connection with the previously described embodiments.

It will be noted that, just as with the first two embodiments, the control of the compensating weight in this embodiment is such that it is not displaced by symmetrically similar movements of both blades, but upon unsymmetrical displacement of the two blades displaces the entire mass provided for compensation purposes in the proper manner to prevent disturbance of the center of gravity of the rotor.

All of the embodiments of the present invention attain the important object of eliminating rotor vibration without requiring any alteration in the construction of the blades. Moreover, it is an important advantage of the present invention that, by eliminating the necessity for attaining close aerodynamic similarity and balance of the blade structures, the way is opened for the use of stiffer blades; long known to be desirable in rotary wing aircraft.

The remaining objects of the invention are achieved by the several embodiments thereof as described herein, the novel structural features characterizing the invention being particularly

I claim:

1. A rotary wing aircraft rotor comprising a hub, a plurality of blades equi-angularly spaced around the periphery of said hub, and a flapping hinge connecting each of said blades to said hub; having in combination: a plurality of adjustably mounted balancing weights each movable along a path aligned with a respective one of said blades, means automatically responsive to hinging displacement of each of said blades for directionally and quantitatively adjusting the respective balancing weight whose path is aligned therewith, and means automatically responsive to such hinging displacement of each of said blades for altering the magnitude of the adjustment of the balancing weight whose path is aligned with another of said blades effected by said first-mentioned means.

2. A rotary wing aircraft rotor as claimed in claim 1 in which there are three of said blades and three of said balancing weights, and in which said means are effective to cause displacement of each of said weights in proportion to changes in value of the expression:

$$2 \text{ vers } A_1 - \text{vers } A_2 - \text{vers } A_3$$

wherein $A_1$, $A_2$ and $A_3$ are the flapping angles of the three blades, respectively.

3. A rotary wing aircraft rotor as claimed in claim 1 in which there are three of said blades and three of said balancing weights, and in which said means are effective to cause displacement of each of said weights equal to changes in value of the expression:

$$\frac{Bg}{3W_c + 2W_a f_a}(2 \text{ vers } A_1 - \text{vers } A_2 - \text{vers } A_3)$$

wherein

B = the mass of each blade;
$W_c$ = the mass of each compensating weight;
$W_a$ = a single mass equivalent in its effect on center of gravity of the rotor to the effect of all parts moved by each blade other than the compensating weight and the blade itself;
$f_a$ = the displacement of mass $W_a$ expressed as a fraction of that of the compensating weight; and
$g$ = the distance from the flapping hinge to the center of gravity of a blade.

4. In an aircraft having a sustaining rotor comprising a hub, a plurality of blades, and a hinge pivotally connecting each of said blades to the hub; the combination of a plurality of compensating weights each radially displaceable relative to the axis of the rotor in a manner affecting the center of gravity of the rotor, and means connecting each of the blades to each of the weights to control the displacement of each of the weights upon displacement of any blade upon its hinge relative to the hub.

5. In an aircraft having a sustaining rotor comprising a hub, three blades, and a flapping hinge pivotally connecting each of said blades to the hub; the combination of a compensating weight radially displaceable relative to the axis of the rotor in a plane substantially coinciding with the plane containing the rotor axis and the axis of a first one of said blades, and means including operating connections between said weight and all of said blades; said means being automatically responsive to displacement of said blades upon said hinges to displace said weight in proportion to changes effected by such blade displacement in the value of the expression:

$$2 \text{ vers } A_1 - \text{vers } A_2 - \text{vers } A_3$$

wherein $A_1$ = the flapping angle of said first one of said blades;
$A_2$ = the flapping angle of said second of said blades; and
$A_3$ = the flapping angle of the third of said blades.

6. In an aircraft having a sustaining rotor comprising a hub, three blades, and a flapping hinge pivotally connecting each of said blades to the hub; the combination of a compensating weight displaceable relative to the rotor in a plane substantially coinciding with the plane containing the rotor axis and the axis of a first one of said blades, and means including operating connections between said weight and all of said blades; said means being automatically responsive to displacement of said blades upon said hinges to displace said weight an amount equal to changes effected by such blade displacement in the value of the expression:

$$\frac{Bg}{3W_c + 2W_a f_a}(2 \text{ vers } A_1 - \text{vers } A_2 - \text{vers } A_3)$$

wherein

B = the mass of each blade;
$W_c$ = the mass of the compensating weight;
$W_a$ = a single mass equivalent in its effect on center of gravity of the rotor to the effect of all parts moved by each blade other than the compensating weight and the blade itself;
$f_a$ = the displacement of mass $W_a$ expressed as a fraction of that of the compensating weight;
$g$ = the distance from the flapping hinge to the center of gravity of a blade;
$A_1$ = the flapping angle of said first one of the blades;
$A_2$ = the flapping angle of the second blade; and
$A_3$ = the flapping angle of the third blade.

7. In a rotary wing aircraft having a rotor comprising a hub and a blade hinged to said hub; the combination of a balancing weight radially adjustable with respect to the axis of rotation of said rotor and means including a cam having a cam rise automatically responsive to said blade during that portion of the hinging displacement thereof with respect to said hub wherein said cam rise is active for directionally and quantitatively adjusting said balancing weight; said cam also having a portion of constant radius permitting of additional hinging displacement of said blade with respect to said hub during which said means is not effective to cause such adjustment of said balancing weight.

8. In a rotary wing aircraft having a rotor comprising a hub and a blade hinged to said hub; the combination of a balancing weight radially adjustable with respect to the axis of rotation of said rotor, a cam and a cam follower relatively displaceable in response to hinging displacement of said blade with respect to said hub, said cam having a cam rise and a portion of substantially constant radius, means operated by said cam when the cam follower is traversing the cam rise for directionally and quantitatively adjusting said balancing weight, said means being positioned by said cam when the cam follower is traversing the portion of substantially constant radius to maintain said weight in substantially a constant position relative to said axis of rotation during additional hinging displacement of said blade.

9. The invention set forth in claim 8 wherein said means operated by said cam comprises a rotatable member connected to the cam follower for operation thereby, and a closed flexible loop connected to said rotatable member for displacement thereby and connected to said balancing weight for effecting said adjusting of said balancing weight.

10. The invention set forth in claim 8 in combination with a second blade located on the opposite side of said axis than said first mentioned blade, and a second cam and cam follower relatively displaceable in response to hinging displacement of said second blade with respect to said hub, wherein said means for directionally and quantitatively adjusting said balancing weight is jointly operated by said two cams when said two cam followers are traversing their respective cams.

11. The invention set forth in claim 10, wherein said means is automatically responsive to displacement of said blades upon their respective hinges to displace said weight by a distance equal to the change effected by such blade displacement in the value of the expression:

$$\frac{Bg}{W_c + W_a f_a}(\text{vers } A_1 - \text{vers } A_2)$$

wherein $B$ = the mass of each blade;
$W_c$ = the mass of the balancing weight;
$W_a$ = a single mass equivalent in its effect on center of gravity of the rotor to the effect of all parts moved by each blade other than the balancing weight and the blade itself;
$f_a$ = the displacement of mass $W_a$ expressed as a fraction of that of the balancing weight;
$g$ = the distance from the center of gravity of a blade to its respective hinge;
$A_1$ = the flapping angle of one of the blades; and
$A_2$ = the flapping angle of the second blade.

HAROLD T. AVERY.

REFERENCES CITED

The following references are of record in the file of this patent:

UNITED STATES PATENTS

| Number | Name | Date |
|--------|------|------|
| 1,980,169 | Cierva | Nov. 13, 1934 |
| 2,173,291 | Ash | Sept. 19, 1939 |
| 2,282,436 | Taylor | May 12, 1942 |
| 2,360,792 | Putnam | Oct. 17, 1944 |
| 2,425,650 | Stalker | Aug. 12, 1947 |